United States Patent
Khan

(10) Patent No.: US 11,531,978 B2
(45) Date of Patent: Dec. 20, 2022

(54) PLATFORM FOR MANAGING MOBILE APPLICATIONS

(71) Applicant: Khizar Ahmad Khan, St. Louis, MO (US)

(72) Inventor: Khizar Ahmad Khan, St. Louis, MO (US)

(73) Assignee: Khizar Ahmad Khan, St. Louis, MO (US)

( * ) Notice: Subject to any disclaimer, the term of this patent is extended or adjusted under 35 U.S.C. 154(b) by 0 days.

(21) Appl. No.: 16/570,339

(22) Filed: Sep. 13, 2019

(65) Prior Publication Data

US 2020/0090157 A1     Mar. 19, 2020

Related U.S. Application Data

(60) Provisional application No. 62/731,370, filed on Sep. 14, 2018.

(51) Int. Cl.
G06Q 20/32     (2012.01)
G06N 5/04     (2006.01)
(Continued)

(52) U.S. Cl.
CPC ....... *G06Q 20/326* (2020.05); *G06F 16/1744* (2019.01); *G06N 5/04* (2013.01);
(Continued)

(58) Field of Classification Search
None
See application file for complete search history.

(56) References Cited

U.S. PATENT DOCUMENTS 8,396,759 B2 * 3/2013 Mehta ................ G06Q 30/0631
705/26.7
9,195,721 B2 * 11/2015 Soto Matamala .... H04W 4/021
(Continued)

OTHER PUBLICATIONS

Liu et al. App Adoption: The Effect on Purchasing of Customers Who Have Used a Mobile Website Previously, May 3, 2019, Elsevier, Journal of Interactive Marketing, 47, 16-34 (https://journals.sagepub.com/doi/pdf/10.1016/j.intmar.2018.12.001) (Year: 2019).*

*Primary Examiner* — Paul S Schwarzenberg
(74) *Attorney, Agent, or Firm* — Perkins Coie LLP; Michael Glenn

(57) ABSTRACT

Embodiments of the invention make consumer application adoption more efficient by giving suppliers access to the desired target audience by displaying the applications to the right audience. Suppliers can provide criteria for the kinds of users they are looking to target using constraints. Embodiments of the invention enable viewers that match the constraints to see the service. The user gets to see an automatically generated application set, that is instantly available, with a high probability of containing the application the user is likely to seek. Identity and Payment support are built into the platform, such that the user no longer needs to register with each application or set up payment with each application. In addition, the platform reduces bandwidth consumption, storage front print, and power consumption of the user device by choosing when and which modules to download to the user device.

20 Claims, 21 Drawing Sheets

(51) Int. Cl.
*H04W 4/02* (2018.01)
*H04L 67/00* (2022.01)
*G06F 16/174* (2019.01)

(52) U.S. Cl.
CPC ......... *G06Q 20/3267* (2020.05); *H04L 67/34* (2013.01); *H04W 4/02* (2013.01); *H04W 4/023* (2013.01)

(56) References Cited

U.S. PATENT DOCUMENTS

| | | | |
|---|---|---|---|
| 2011/0218974 A1* | 9/2011 | Amit | G06F 16/00 707/693 |
| 2012/0221384 A1* | 8/2012 | Avadhanam | H04W 4/50 705/14.4 |
| 2013/0124606 A1* | 5/2013 | Carpenter | H04L 67/06 709/203 |
| 2015/0262069 A1* | 9/2015 | Gabriel | G06F 16/9535 706/48 |
| 2016/0217215 A1* | 7/2016 | Zargahi | G06F 16/248 |
| 2016/0239885 A1* | 8/2016 | Goolsby | G06Q 30/0635 |
| 2016/0299977 A1* | 10/2016 | Hreha | G06F 16/24578 |
| 2017/0181099 A1* | 6/2017 | Jeyapaul | H04W 4/50 |
| 2020/0034518 A1* | 1/2020 | Mezzalira | G06F 21/44 |

* cited by examiner

PLATFORM FOR MANAGING MOBILE APPLICATIONS

CROSS-REFERENCE TO RELATED APPLICATIONS

This application claims priority to the U.S. Provisional Patent Application Ser. No. 62/731,370, filed Sep. 14, 2018, which is incorporated herein by reference in its entirety.

FIELD

Various of the disclosed embodiments concern a platform for managing mobile applications.

BACKGROUND

Application adoption is inefficient with suppliers not having access to the desired target audience because the applications are not displayed to the right audience. Further problems occur with the need to develop, market, distribute, install, upgrade and register their applications. Additionally, suppliers are not provided with additional information about the user, such that there is no way for enabling businesses to specifically cater to the user's needs.

BRIEF DESCRIPTION OF THE DRAWINGS

One or more embodiments of the present disclosure are illustrated by way of example and not limitation in the Figures of the accompanying drawings, in which like references indicate similar elements.

Figure 1:
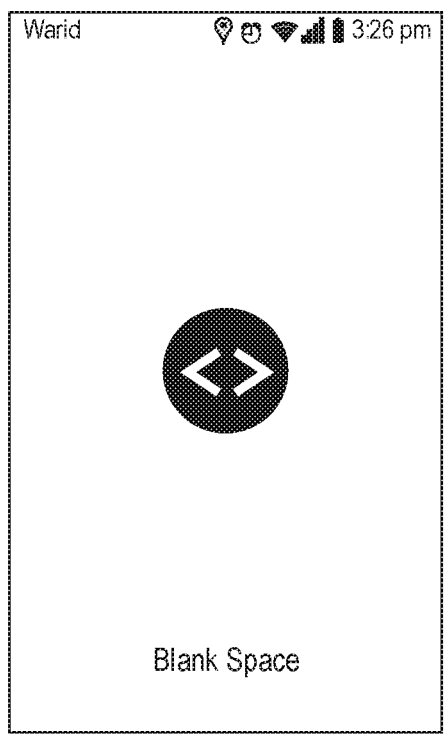
FIG. 1 shows a splash screen.

Those skilled in the art will appreciate that the logic and process steps illustrated in the various flow diagrams discussed below may be altered in a variety of ways. For example, the order of the logic may be rearranged, sub-steps may be performed in parallel, illustrated logic may be omitted, other logic may be included, etc. One will recognize that certain steps may be consolidated into a single step and that actions represented by a single step may be alternatively represented as a collection of sub-steps. The Figures are designed to make the disclosed concepts more comprehensible to a human reader. Those skilled in the art will appreciate that actual data structures used to store this information may differ from the Figures and/or tables shown, in that they, for example, may be organized in a different manner; may contain more or less information than shown; may be compressed, scrambled and/or encrypted; etc.

DETAILED DESCRIPTION

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein.

Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Detailed Description section.

Mobile Application

Embodiments of the invention make consumer application adoption more efficient by giving suppliers access to the desired target audience by displaying the applications to the right audience, by eliminating the need to develop, market, distribute, install, upgrade and register their applications, and by providing suppliers with additional information about the user, thereby enabling businesses to specifically cater to the user's needs.

Suppliers, i.e. providers, can provide criteria for the kinds of users they are looking to target using constraints. Embodiments of the invention enable viewers that match the constraints to see the providers mobile application.

Embodiments of the invention also improve the user experience by providing them the right services at the right time, by eliminating hurdles associated with conventional applications (search, download, install, register), and by reducing the challenges of identity/privacy/transaction/trust.

The user gets to see an automatically generated application set, that is instantly available, with a high probability of containing the application the user is likely to seek. Identity support, Payment and integrated cart management support are built into the platform, such that the user no longer needs to register with each application, or set up payment with each application. In addition, the platform reduces bandwidth consumption, storage front print, and power consumption of the user device by choosing when and which modules to download to the user device.

Breakdown of Major Functional Features

Application Recommendation: Embodiments of the invention provide the right application at the right time, thus greatly reduces effort associated with searching for the right application. This eliminates the hurdles associated with downloading, installing, and deleting current mobile applications.

A dynamic set of applications (as opposed to a static set) most likely to be used, referred to as SAPPs, is provided to the user. SAPPs can be any service provided by a vendor, i.e. provider, such as a website, an application, an audio message, etc. The vendor can also develop and host SAPPs on a platform server.

The client application monitors the user's behavior and uses behavioral analysis to come up with a recommendation list. This list of applications is live when presented, and there is no need for the user to go to the Google Play Store and download them. If the algorithm fails to provide/recommend/display the application, the user can choose to search directly for the application. The recommended application set view is driven by a context engine that observes user behavior and collects context data, such as age, location, user behavior, crowd behavior, environmental (rain or shine, hot or cold), etc. This recommended list is continuously updated based on changes in context. In an embodiment, each application in the recommended list is a TinyURL website registered to a server by its supplier. These applications become more sophisticated over time. A server manages all the application registration and storage requirements of the applications.

Application Management.

At some point the applications can evolve beyond simple websites to client/server applications, client application, virtual machine contained applications. In such a scenario, the aim is to optimize bandwidth usage and not be continuously installing and deleting the same application. The software has a management engine that decouples the viewability and the availability of the applications.

Applications the user may see on his user interface (recommended applications), and applications actually stored/available on his device, are different sets. This is similar to code pre-fetching and caching. The actual application can be automatically (partially) downloaded/installed/archived/deleted by the application management engine. One way to do this is to enable application level control in the application management engine. The engine can display/remove each application from view automatically. The engine should also be able to install (on demand or speculatively) applications automatically. The engine can allow for automatic download of applications whose codes are not present locally. The engine can allow for deletion of the application code (purging) while continuing to display the application icon as if the application is available and present. The engine should allow for retaining code of application which is no longer visible.

When a user clicks an application that is not available locally (present on the client), the application management engine seamlessly downloads and installs the application in the background, and makes it available to the user. As a result, the user does not see any denial of service except for an occasional slowdown when the necessary code is not present locally and has to be downloaded (cache-miss case). The slow-down can be imperceptible, as mobile network speeds increase.

Storage and Bandwidth Optimization.

With the enablement of the application management engine, it is possible that the storage used by the application set may increase. To handle this scenario the platform has a storage optimization engine that smartly manages the storage space. The storage optimization engine downloads only what is needed (this concept may extend to downloading only a fraction of an application). Such applications can include:

Archived applications: Applications that were used but are not used currently are archived.

Deleted applications: Applications that were previously downloaded but are no longer used are deleted.

Infrequently used applications: Infrequently used or older applications are hidden or purged.

New applications: The application should be downloaded when invoked or be speculatively downloaded if it matches a specified criteria—such as high likelihood of usage.

Reused applications: If a previous copy of the application exists it can be used instead of re-downloading the application else it is traded as a new application.

Visible but not present: It may happen that the actual code that is associated with an icon that is currently visible may not be on the device.

Present but not visible: the application code of an icon not currently visible is actually present on the device.

Unused applications: Applications which have not been used or are least frequently used can be automatically deleted.

There are various methods that can be used to develop applications that also allow those applications to minimize their storage footprints, for example, by using an online application framework, which results in lower storage requirements as they let the server do the work; by using on demand download; by letting the client do the work, but download only what is needed (similar to a microprocessor caching mechanism), which can result in a better usage of storage; by using smart libraries: download only what you need—and the shared libraries enable lower usage of storage; and by deploying an algorithm which determines what to keep and what to discard even in the cache. In the latter case, there are algorithms for this, for example, something as basic as least recently used (LRU), but the system could scale beyond to using crowd behavior.

In embodiments, identity management is provided to reduce the identity, security, privacy, and trust hurdles associated with current mobile applications. Single sign-on secure identity management can be used to set up identity, where the user specifies their identity once, a one time token (OTT) is generated by the system server and provided to the SAPP, which the SAPP provider can use to identify/authorize the user with the system server upon end user approval, where the approval is taken from the user by the system server through push notification confirmation. Once the user agrees to/approves of the SAPP verification request, the system server authenticates the user as well as shares classified information with the requesting SAPP.

In embodiments, transaction management payment management eliminates the user/payment/security/trust hurdles associated with current mobile applications. Many people shy away from conducting transactions with new websites because they do not know how their credit card/payment information is used. They (users) perceive an increased risk of fraud. There is also the hurdle of having to enter credit card and billing information into a small user interface (small buttons/poor screen interfaces). Transaction management built into the system reduces the hurdles of conducting transactions on the mobile device. Payment information is managed by a central service. During initialization, or at a later point, a user specifies credit card information, ID, billing address, and the charge; the supplier bills central service; the user "OKs" (is prompted via notification to review and approve the charge); the central service charges the card on behalf of the supplier, notifies the supplier about success/failure, and notifies the customer about success/failure. In case of refunds, supplier notifies the central service of refund transaction and the central service issues refund to customer card. Receipts are managed within the application. The user can show the receipt to validate their claim/identity. Because of the overall integration, the central service enables commerce for small suppliers who otherwise would not have managed to secure the trust of the customer.

In embodiments, sideband information management provides additional information to the supplier when an application link is clicked. Cookies, etc., and even Google provide very little information about how a user ended up at a website. This sideband information management provides a lot more information to the relevant supplier, enabling them to better cater to customer needs. At application registration, the provider specifies the constraint/criteria for making the SAPP visible and also specifies what data fields they can handle, so that when the user clicks the specified data field, the data entered into the data field is sent to the provider. At a user click, the supplier gets a unique ID that can be used to access a separate database, and uses the ID to access more information about the user profile and user session from that separate database.

DETAILED DISCUSSION

Embodiments provide a one-window solution for a location-aware hybrid application providing users of the application information about, for example, commercial services offered, available public services, small and large business, events, activities, malls, etc.

The application shows a user the available services with regard to the location of the user. The system continuously updates itself based on the location of the user and icons of the services are updated on the user's screen. In this embodiment, the application is a native application and is available as a free download from Google Play Store, Apple Application Store, or from a third party website.

Push notifications are available to the user irrespective of which screen he or she is on or whether the user is using the application or not. The application supports both portrait and landscape orientations. The application works on devices that are 5 inches (phone), 7 inches (tablet), and 10 inches (tablet), in both portrait and landscape mode. Additionally, the website functionality is also there, similar to icloud.com.

The user can register on the system with a valid phone number or Facebook or Google account or a valid email. Once an identity is verified, user is able to access the system. The native application opens a mobile version of the system in a web view. In embodiments, the SAPP portal uses HTML5 location facility to identify user location. The system displays the available SAPPs based on context criteria to the user location in terms of icons.

The icon on the dashboard continuously changes based on context and location. The user can click an icon and it takes the user to the SAPP service. The user can pin the application, in other words, make it a favorite. If the user is viewing SAPP outside of its operating hours but still meets the context criteria (e.g., the vendor may have specified display of the icon even outside of operating hours), then the icon is greyscaled.

Sharing of SAPP Through the User Device.

The dashboard is responsive and it adjusts as per the screen size. In embodiments, there are two modes, adjustable via settings, to display icons. One mode directly displays the icons based on context criteria. A second mode groups icons based on hashtags and puts the icon in those hashtag folders.

For a fresh user, the system shows dashboard based on context, which is most likely the most searched hashtags in the system, or what other people have been clicking on in that location. The system starts building the user profile and replaces the system hashtags-based dashboards with the user searched hashtags and/or hashtags the user is most likely to search. For a fresh user, the platform starts with a default profile, based on location. The guiding principle for establishing the profile being that if other people in this area have behaved in a certain way and have certain traits, it is reasonable to assume that the new user has similar traits given the limited information the platform has about the user. So, the user profile is essentially "inheriting" the properties from the profile models of those who have been in this location.

If the platform determines that a new user, say user A, behaves a lot like another user, say user B of the application, the platform can infer that the user A is most likely going to continue to behave like user B, and use user B's information to fill in missing information about user A.

Installation.

Users download and install the mobile application, for example, from the Google Play Store. The application then starts downloading on the user mobile device and shows the installation progress.

First Time Application Execution.

When the user first runs the application, the splash screen appears for around three seconds (see FIG. 1).

Figure 2:
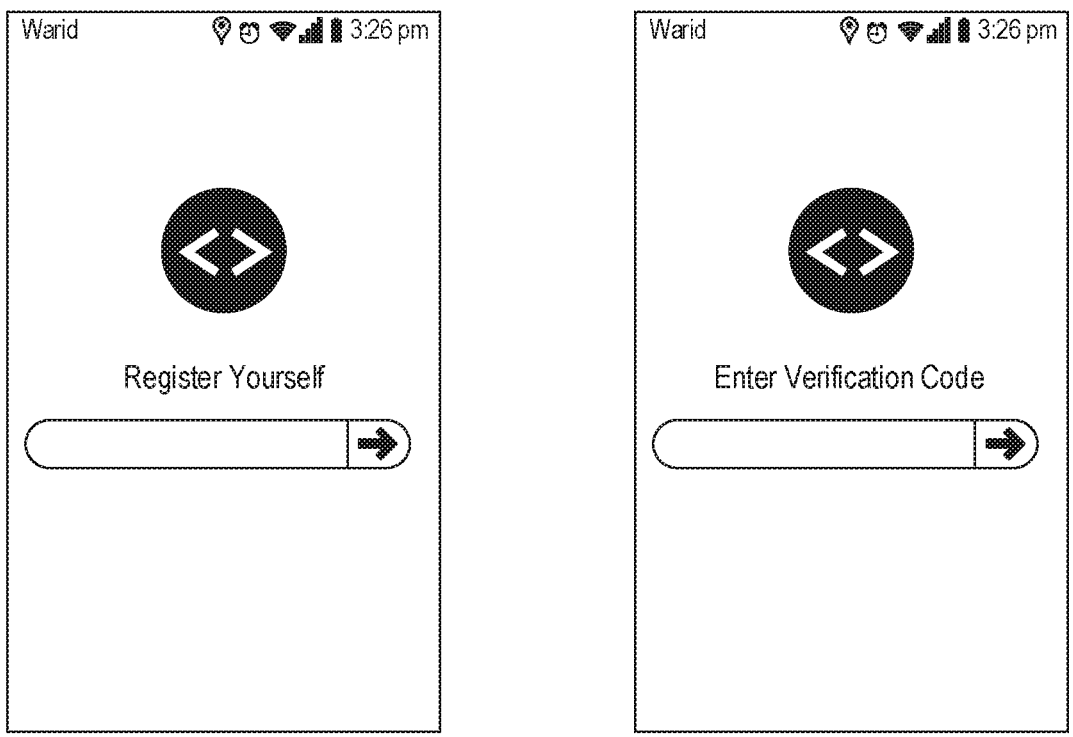
FIG. 2 shows user registration screens.

User Registration. The application displays a user registration page. The user enters a valid phone number. The system sends a verification code to the provided number. The application automatically picks up the verification code. The application confirms the verification code and then allows the user to continue if verification is successful (see FIG. 2).

Dashboard.

Figure 3:
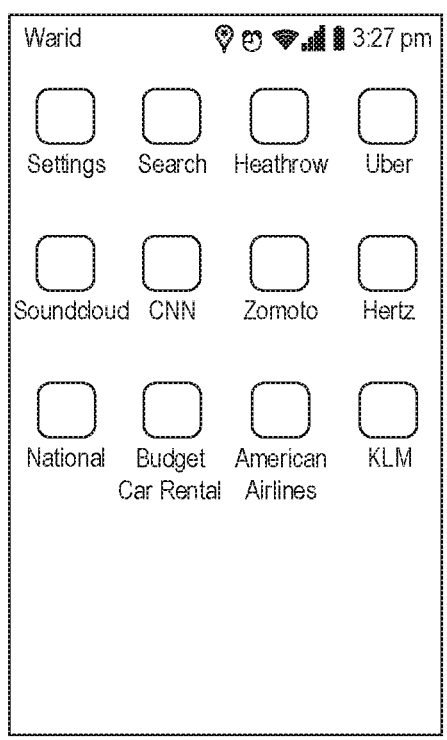
FIG. 3 shows a dashboard.

FIG. 3 shows the dashboard the user sees after login. The dashboard always displays the settings and search icons. The dashboard also displays the available services icons with respect to the context and location of the user. As the user moves around, the application refreshes itself after the refresh interval seconds, such as 2 seconds, configured in the settings and displays updated services icons (see FIG. 4). The application may also calculate the refresh interval based on the frequency of user interaction with the device, or the speed of movement of the user. For example, if the user frequently interacts with the devices and changes the applications used, the refresh interval can be smaller than the frequency of switching the applications. Similarly, if the user changes locations quickly, the refresh interval can be smaller than the change of location.

Figure 5:
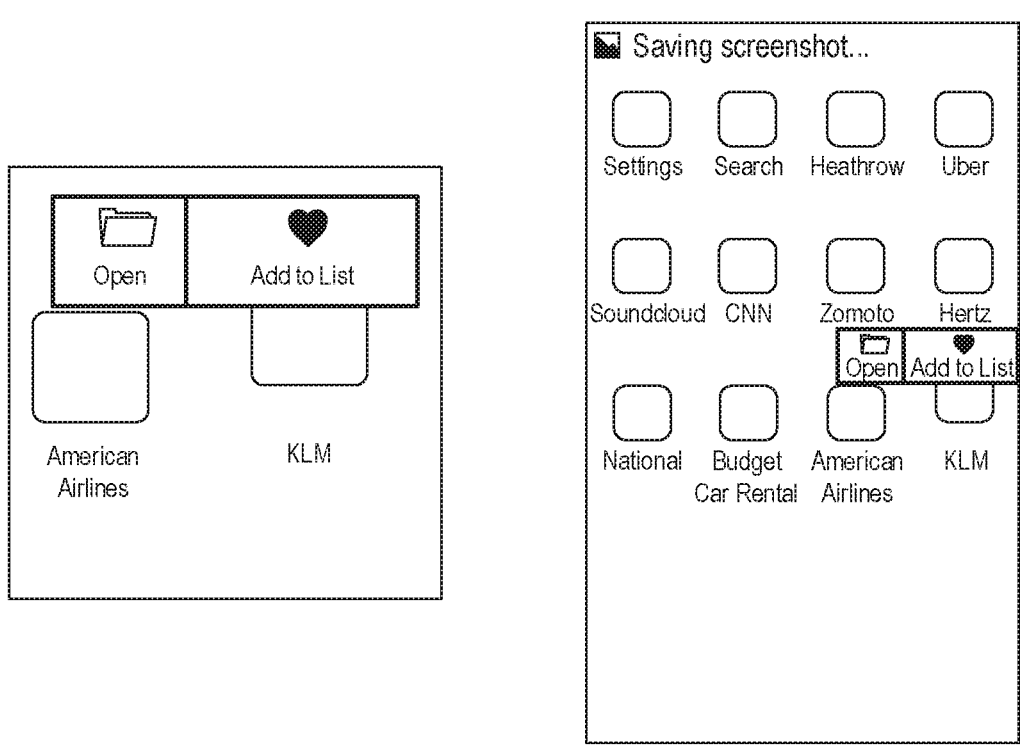
FIG. 5 shows an icon and a Dashboard—Service Icons—Long Pause—Open.

Dashboard—Service Icons—Long Pause (See FIG. 5).

When user does a long pause on any service icon, the application displays the options: Open, Call, Directions (if these are provided by the vendor at the time of link registration), Pin, Delete, and Add to List, or any other vendor provided options. The service icon keeps hopping for a while.

Figure 6:
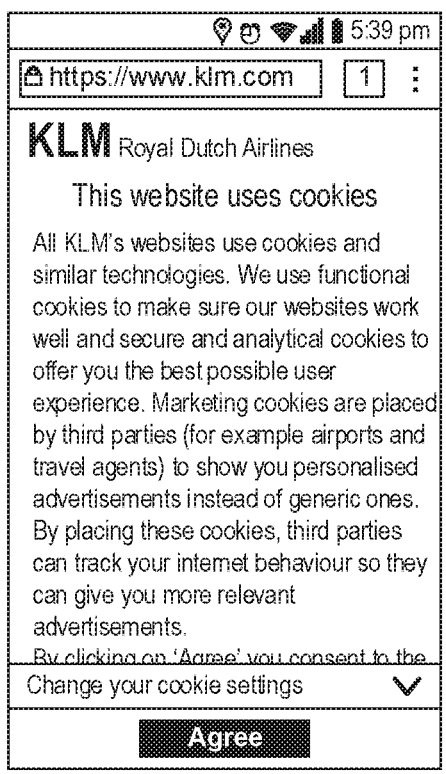
FIG. 6 shows Dashboard—Service Icons—Long Pause—Open.

Dashboard—Service Icons—Long Pause—Open (See FIG. 6).

When the user clicks on open option, the application displays a loader for a while and before it opens the relevant link.

Dashboard—Service Icons—Long Pause—Call.

When the user clicks the call option, the application opens the phone dialer with the contact number of the SAPP already populated.

Dashboard—Service Icons—Long Pause—Directions.

When the user clicks the directions options, the application opens the default maps application installed on the user device for navigation to the SAPP location.

Dashboard—Service Icons—Long Pause—Pin.

This allows the application to be pinned to the dashboard and keep it around (this is useful for frequently used Uber-like applications). Although the context engine should be able to figure this out, it is likely that some users may have a specific application that they want to keep around. After some time, they can move the application to their favorites.

Dashboard—Service Icons—Long Pause—Delete.

Delete is user's way of saying that the application is always irrelevant or they do not like the application, so never show it again.

Dashboard—Service Icons—Long Pause—Add to List.

Figure 7:
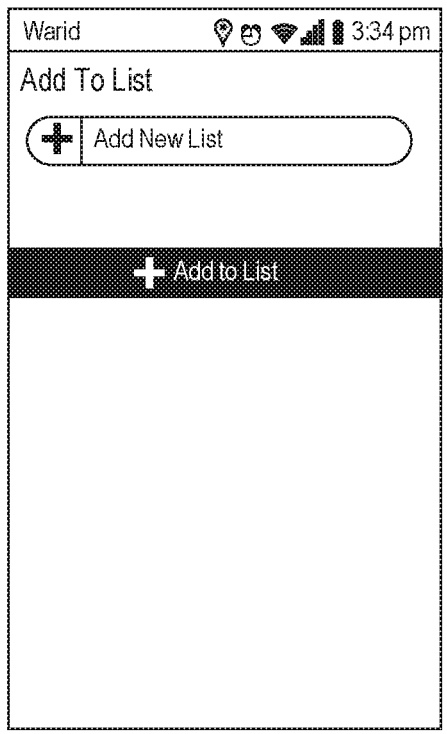
FIG. 7 shows a blank and a populated add to list and corresponding dashboards.
Figure 7:
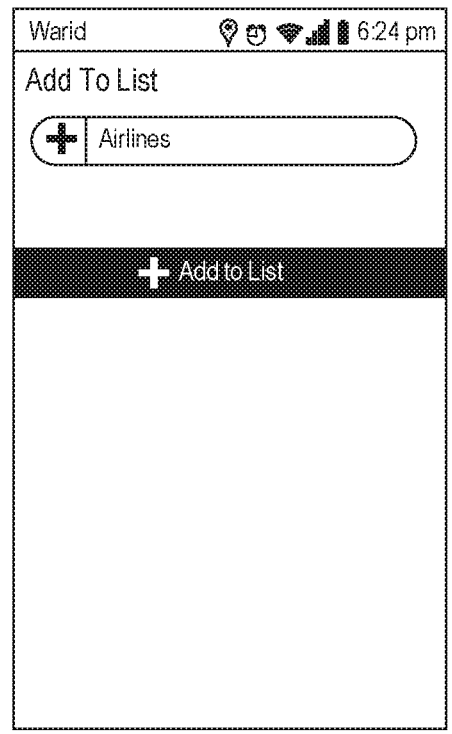
Figure 7:
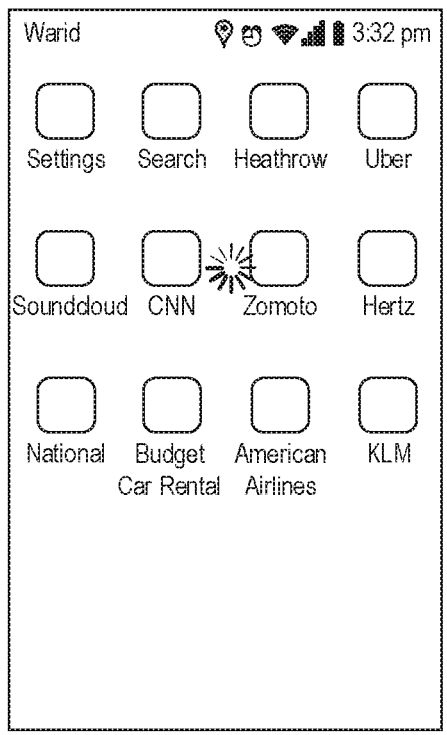
Figure 7:
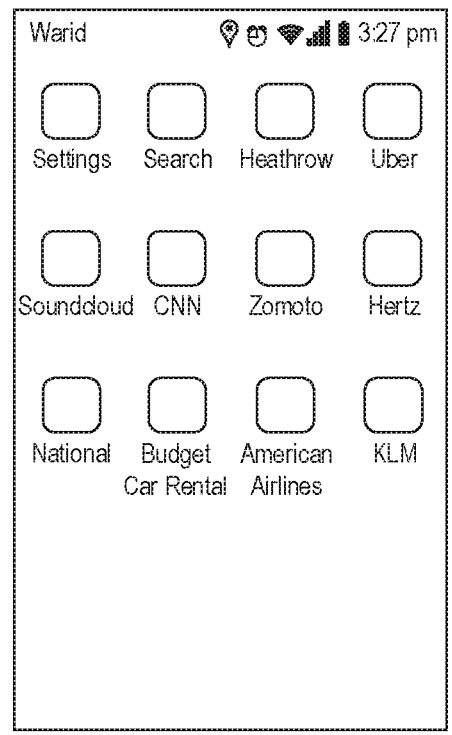

When user clicks on the Add To List option, the application displays the Add To List screen. It displays the option to Enter List Name. The user can create as many lists as he or she wants (see FIG. 7).

Figure 8:
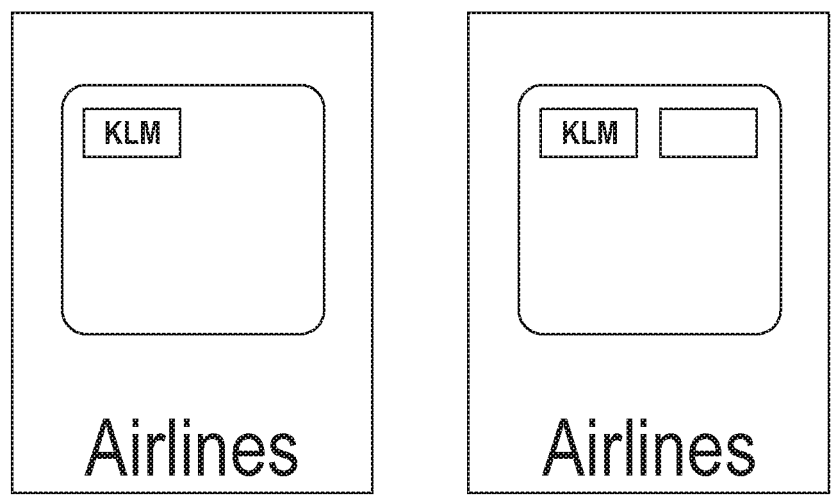
FIG. 8 shows a Dashboard as a folder icon.
Figure 9:
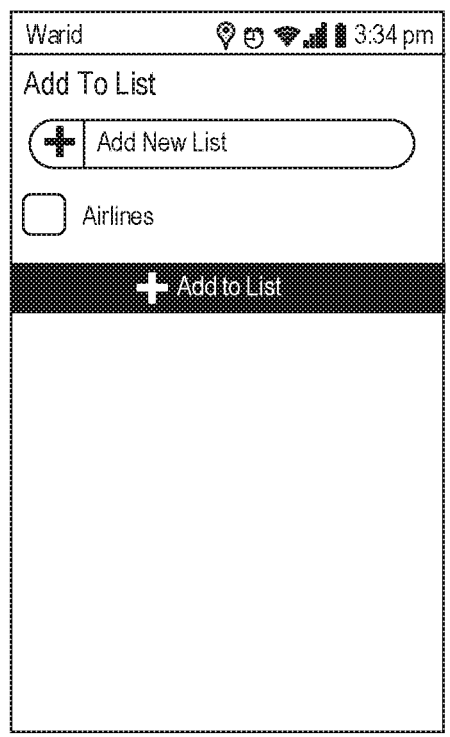
FIG. 9 shows when a user clicks on Add New List again on any service icon, the already created lists appear with a checkbox.
Figure 10:
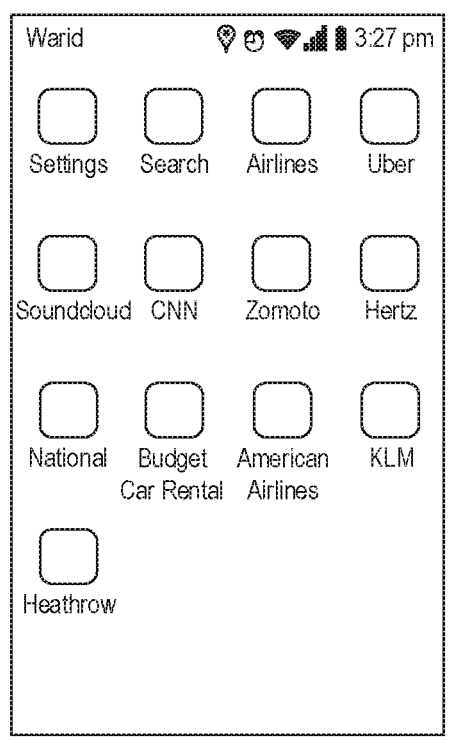
FIG. 10 shows service icons added in the List folder icon.

When New List is created, it is displayed on the dashboard as a folder icon (see FIG. 8). When user clicks on Add New List again on any service icon, the already created lists appear with a checkbox. The user can either create a new list or select the existing list (see FIG. 9). The service icons are added in the list folder icon (see FIG. 10).

Dashboard—Settings.

Figure 11:
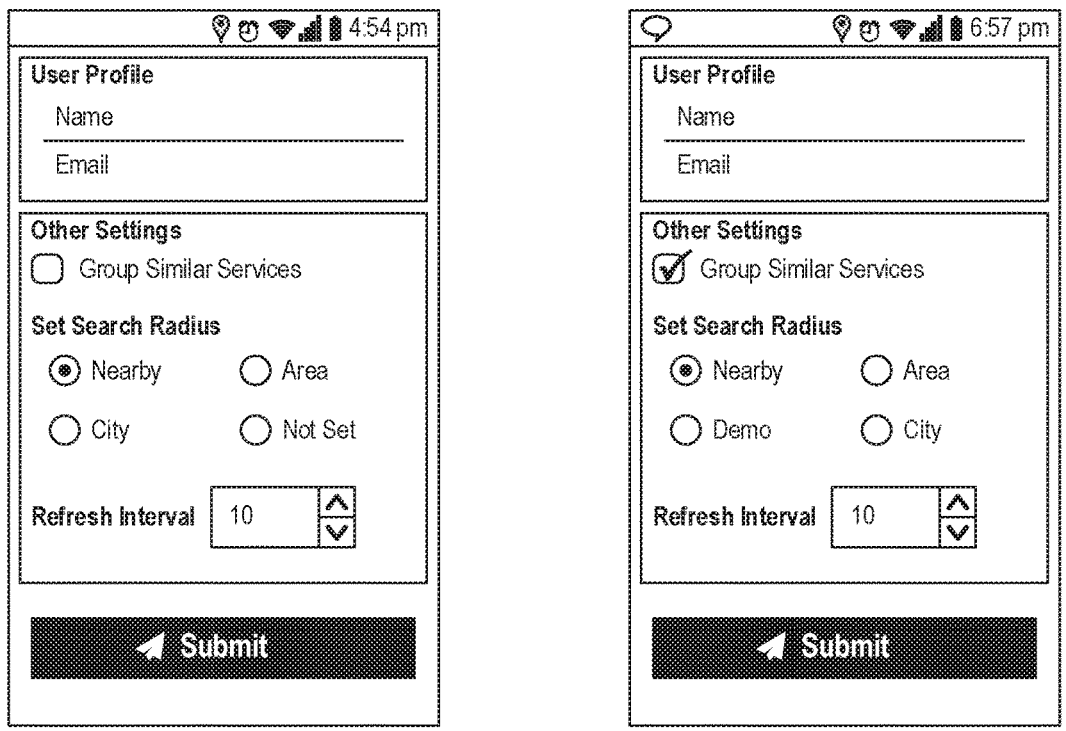
FIG. 11 shows Dashboard—Settings.

When the user clicks on the settings icon, the application displays a screen (see FIG. 11). The application allows the user to update his profile name and display his email. The application also displays options to Group Similar Services (this is hashtag grouping). By default, the application displays the services available in a radius "nearby." This option appears selected by default. The application allows the user to display services within area, city or irrespective of the radius. By default, the application refreshes and displays updated service icons after 10 seconds. The user can also update the refresh interval.

Dashboard—Settings—Group Similar Services.

Figure 12:
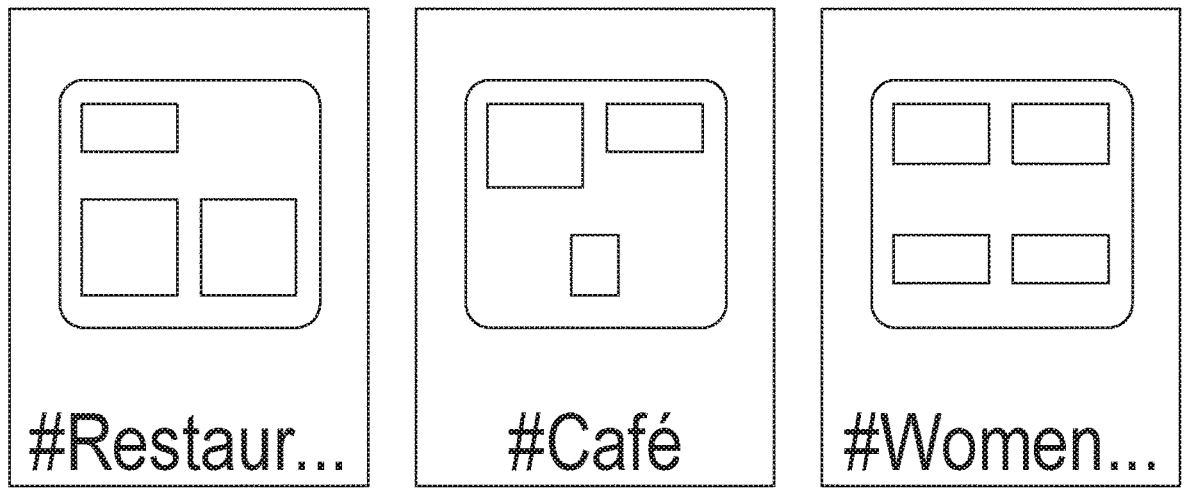
FIG. 12 shows icons for similar services.
Figure 13:
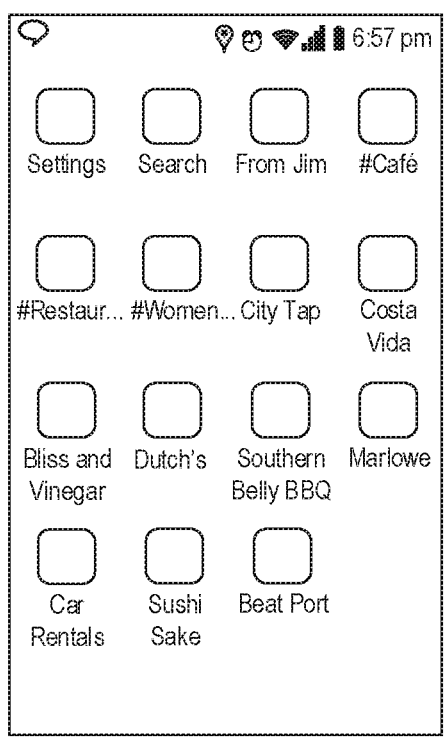
FIG. 13 shows a typical dashboard with grouped icons, list icons and other sub application (SAPP) icons.

When the user clicks on submit after setting Group Similar Services, the application groups the similar services (see FIG. 12). This grouping is based on hashtags. When the services are grouped, the grouped icon on the dashboard appears with a hashtag. A typical dashboard with grouped icons, list icons, and other SAPP icons is shown in FIG. 13. In FIG. 13, From Jim is the list created by the user; #Cafe, #Restaurants, #WomenClothing are the grouped icons; other icons are the SAPP icons.

Dashboard—List Icon—Long Pause.

When the user does a long pause on any list icon, the application displays the options: Open, Manage List, and Share. The list icon keeps hopping for a while.

Dashboard—List Icon—Long Pause—Open.

When the user clicks on the Open option, the application displays the dashboard with the SAPP service icons contained in this list.

Dashboard—List Icon—Long Pause—Manage List.

When the user clicks on the Manage List option, the application displays a screen similar to the Add to List screen. The screen displays the names of all SAPP services in that list with a checkbox, along with Delete and Share List options. The user can share the complete list through WhatSAPP. The user can select the SAPPs and delete them.

Dashboard—List Icon—Long Pause—Share.

When the user clicks on the Share option, the application lets the user Share the complete list through WhatSAPP.

Dashboard—Search.

Search can be used to perform a hashtag search within the system or do a Google search. If the system search does not return any results, then the system does a Google search and returns results in a web page.

Identity Management.

In embodiments, the system acts as the central identity manager for its registered user, whereby the system provides authentication services to other systems/applications/services so that third party systems can use the system's authentication API to authenticate the validity of a user. In embodiments, the API is based on OAuth v2. This enables SAPP vendors/providers to authenticate/verify a user by using the system's identity management, rather than by creating an identity management system themselves. System users have the benefit of not memorizing multiple users and passwords for different systems and can use the system's credentials to authenticate themselves with other systems.

E-Wallet and Payment Service.

In embodiments, the system also acts as an e-wallet/payment service for its users, whereby the system's users can make payments on third party sites, especially SAPPs, through the system, and they do not need to enter their payment details on different websites. This provides users with an alternative payment method, having the option of either using their credit cards directly on multiple websites or using the system as the payment service. This also gives the user control over the services with which they share their financial details.

Configuring Payment Methods.

The user can configure payment methods in the system. The user can have multiple payment methods which, in embodiments, can either be PayPal or credit/debit cards. The system generates a BlankSpace Secure Code (BSSCode) which is used by the user when making payments through the system payment API. Payments through the system are verified through either 1 Factor Authentication (1F-Auth) or 2 Factor Authentication (2F Auth); 2F-Auth, for example, is where the system performs a push notification transaction verification using one time approval (OTA), and 1F-Auth is where only an OTA is needed.

Integration with the System API.

The SAPP vendor, as well as third party systems, can integrate the system Public Payment API within their systems to allow facilitation of payments through the system. Once integrated, a system icon appears in the payment options page of SAPP and Third-Party Systems. A user clicks the system icon and is redirected to a page where the user can enter the BSSCode and acknowledges the OTA which is sent through the push notification to user registered number. Once the BSSCode and OTA are verified by the system, the configured payment options is displayed to the user and the user can select one of the payment options to proceed with the payment. Once the payment is done, the user is again redirected to the actual site on which user wanted to make the payment. The system notifies the SAPP or a third-party system (TPS) about the confirmation of payment and the user purchase is completed.

Contextual/Traits/Behavioral Usage Tracking/Pattern.

One important part of the system is usage tracking and usage pattern of the end user. In embodiments, the systems records, for example, all user searches, all user clicks, hashtags of clicks, user movement, and other sensor data. This activity tracking and recording feeds the system contextual/behavioral engine, which identifies different end user attributes based on activity and usage pattern. These attributes are used by SAPP vendors for tailor made responses, and by the system itself to serve best possible listings in future refreshes of all users.

Contextual/Behavioral Engine.

The contextual/behavioral engine is a main component of the system which is responsible for attribute identification and user traits based on the user usage pattern.

Contextual API.

One important aspect for businesses is knowing about their potential consumers/visitors and their various attributes. Attributes can range anything from user gender, age, date of birth, preferences, religious inclination, mood of user, need of the user, etc. Based on these attributes, businesses can create/design a tailor-made solution/offering for a specific consumer/visitor, thereby increasing the chance of closing/generating a transaction. The system, through its Context Engine, determines all of these attributes based on user usage pattern and monitoring other behavioral aspects of the user, and exposes the attributes to SAPPs through the API. SAPPs vendors/providers can use these attributes to generate responses for any individual visitor.

Vendor Portal.

The vendor portal is the place where SAPP vendor/providers register themselves and then list their services as SAPP. In embodiments, the vendor portal has the following features:

Vendor Account.

Vendors are able to register with a valid email id. Vendors initially have a free account. With the free account, Vendors can create limited number of SAPPs. Vendors can subscribe/request paid packages, which extend the limit of SAPPs which they can create. Payment is through credit/debit card. Vendors can also delete/close their account. Vendors can view messages from the system administrator.

Vendor SAPPs.

The vendor can create new SAPPs. Vendors can view a listing of the SAPPs, deactivate, reactivate, and delete SAPPs. An individual SAPP has the following details:
 SAPP Name;
 SAPP Availability Location (Exact Location, Neighborhood, City, Country, Continent, Globe);
 SAPP Location Latitude/Longitude (Multiple locations can be associated with a single SAPP);
 Link to existing SAPP Website or Mobile Application;
 SAPP Icon (specific size and dpi) to be displayed on the Dashboard;
 SAPP Expiry Date;
 SAPP Hashtags (multiple hashtags can be associated with a single SAPP);
 SAPP Active/Inactive Flag; and
 Operating Date and Times of the SAPP.

SAPP Audience Management.

SAPP vendors have the option to control the viewership of their SAPPs. SAPP vendors can specify, based on attributes, what kind of audience can view the SAPP. Vendors can specify, based on age, gender, belief, views, lifestyle, time of day and other attributes, to whom and when the SAPP is visible.

Contextual Query Definition.

This is where the vendors specify what combination of attributes specific to end-consumer individual SAPPs are needed, so that a tailormade response can be provided when the SAPP is clicked. The vendor can request multiple attributes on a single click to have the best possible response for the end user. In embodiments, attribute usage for the SAPP by the vendors is billed.

Vendor Campaign Management.

This is where vendor can estimate the charges incurred based on the selected attributes. The vendor can select and deselect attributes and estimate charges for usage of attributes for individual SAPPs. The vendor can also generate URLs with different values of selected attributes and use these to test with their systems for different use cases with regard to different value sets. This assists the vendor to budget their attribute usage properly and define marketing campaigns.

SAPP and Contextual API Integration Flow.

A SAPP vendor first selects the SAPP to which he or she adds contextual attributes. The vendor is provided with a list of attributes to select from and use with the selected SAPP. With each selection of attribute, the vendor is provided with an estimated cost per single use of that attribute. The cost is the cumulative cost of all the selected attributes. The vendor, after selecting, can simulate the selected attributes with generated values. Once the vendor confirms and finalizes the selected attributes, the vendor is provided with the option to select a method of attribute passing as preferred and supported by the SAPP. The vendor can select the passing of attributes either using query parameters, as a post body in JSON format, or another method of specifying constraints. Once confirmed, the vendor can then implement and integrate the selected method within their SAPP. The vendor can also apply the attributes as filters for audience filtering. The vendor can select multiple attributes to apply as filters, thereby customizing the span of the audience. Adding more attributes to a SAPP restricts the audience of the SAPP, whereby the system applies all of the attributes and displays the SAPP to the filtered audience, thereby increasing the chances of audience conversion. The vendor can set budgets and bids for contextual information. The vendor can also specify how much amount to spend on specific attributes. For instance, if showing SAPP to males between the ages of 20-30 is particularly valuable to vendor, the vendor can use bid adjustments to increase their bid for boys and age group. The vendor can also specify the budget for viewable impressions/counts. For example, a vendor can specify how many times a user should see the SAPP based on the same values of attributes applied as filters. After the count is reached, the SAPP is removed from the list of SAPPs displayed to the user.

Data Flow from the System to SAPP.

A system user sees a SAPP and clicks the SAPP. The system retrieves the contextual attribute-based information from the context engine for that particular user. Identified information is then passed on to the SAPP for response generation. In the case of a refresh, the required contextual information is passed to the SAPP based on the latest values of the attributes.

Vendor Activity Management.

Vendors can download activity logs on their SAPPs for offline analysis. Vendors can specify which end user attributes to log for individual SAPPs. Activity logs can include, for example, which SAPP was clicked, when it was clicked (date/time), from where it was accessed, and/or user attributes of the end user who accessed the SAPP. Activity logs can be downloaded, for example, in csv, delimited, or text format.

Vendor Billing Module.

A vendor can specify their billing details in this module. In embodiments, vendors can use Visa and MasterCard credit cards, as well as use their PayPal account. Vendors can also review their billing history/payment history in this module.

Vendor Transaction Module.

For each purchase that occurs through the system, the vendor can manage transaction logistics, for example, when was the transaction, for how much, for a refund or credit, or for cancellation/null voiding the transaction, when was the settlement date.

Further Details

Figure 14:
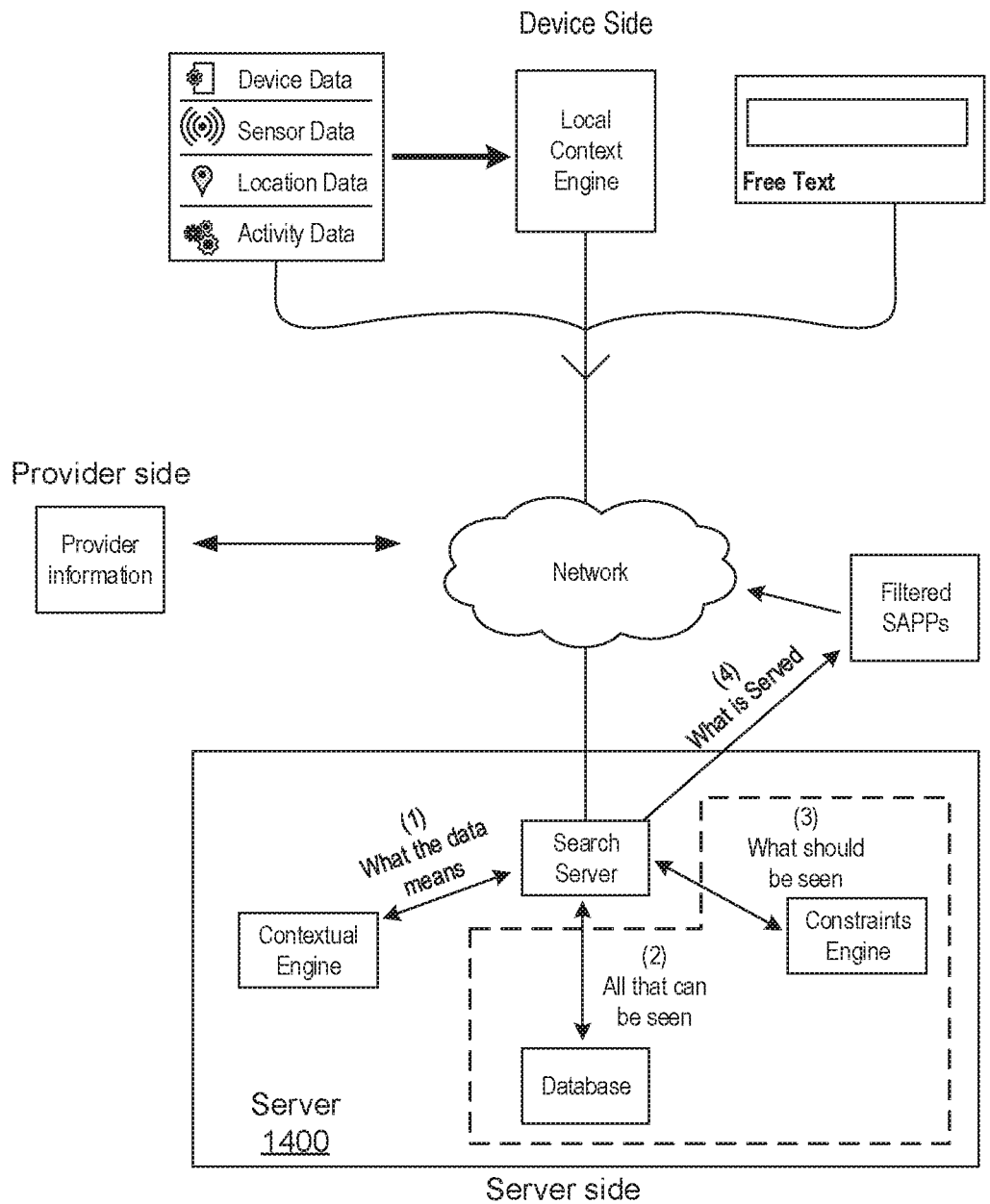
FIG. 14 shows system flow design.

FIG. 14 shows system flow design. As seen in FIG. 14, the information associated with the device including device data, sensor data, location data, and activity data are filtered through a device-side context engine, which determines which of the device information to pass to the server. The filtered information, along with the text entered by the user, are passed to the server 1400 through a network. The search module on the server 1400 receives the data from the user device and communicates the data to various other modules including a context engine, database, and/or constraints engine. In addition, the search module on the server 1400 can receive provider information such as the desired user attributes, provider profile, etc., as described in this application.

Figure 23:
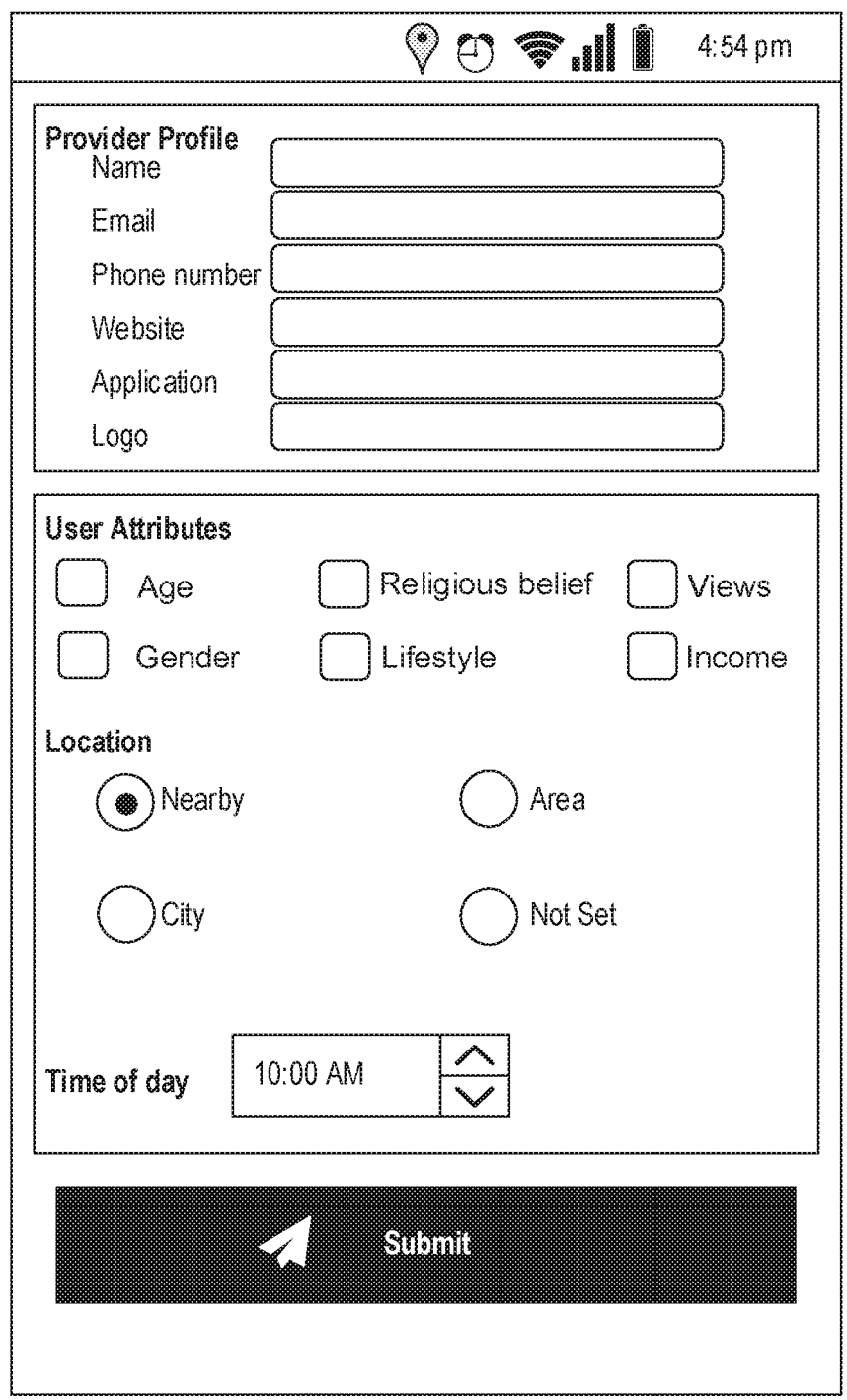
FIG. 23 shows a provider interface.

The context engine analyzes the received data and categorizes the data into various user attribute categories as shown in FIG. 23. The database can store the received data from the user device side as well as the provider side. The constraints engine can match the user attributes inferred from the user data and the desired user attributes specified by the provider, and determines which filtered SAPPs to serve to the user.

For each SAPP, the constraints engine contains the criteria for selecting the target audience as specified/designed by the provider. For example, the constraints engine can store queries specified by the provider, where the query specifies what user attributes and data fields the provider is interested in. When the user meets the criteria specified by the provider, the SAPP associated with the criteria is available to be shown to the user. When a user actually clicks the SAPP, the actual values obtained for that particular user for that session are passed to the SAPP provider, as a query response. The query response can also include the values that the provider can actually handle.

Figure 19:
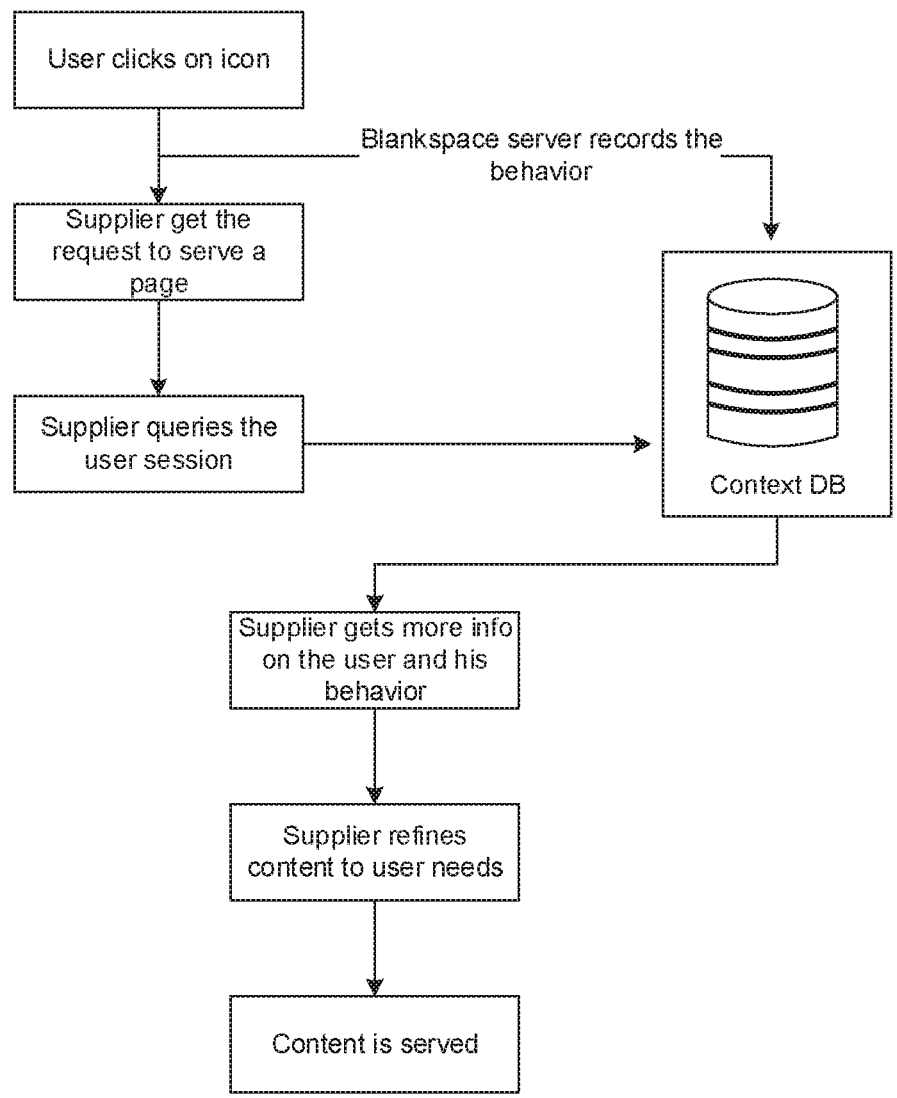
FIG. 19 shows sideband information flow.

4. Sideband information, this is additional information that is passed to the SAPP when a user clicks a specific SAPP. (FIG. 19)

Figure 15:
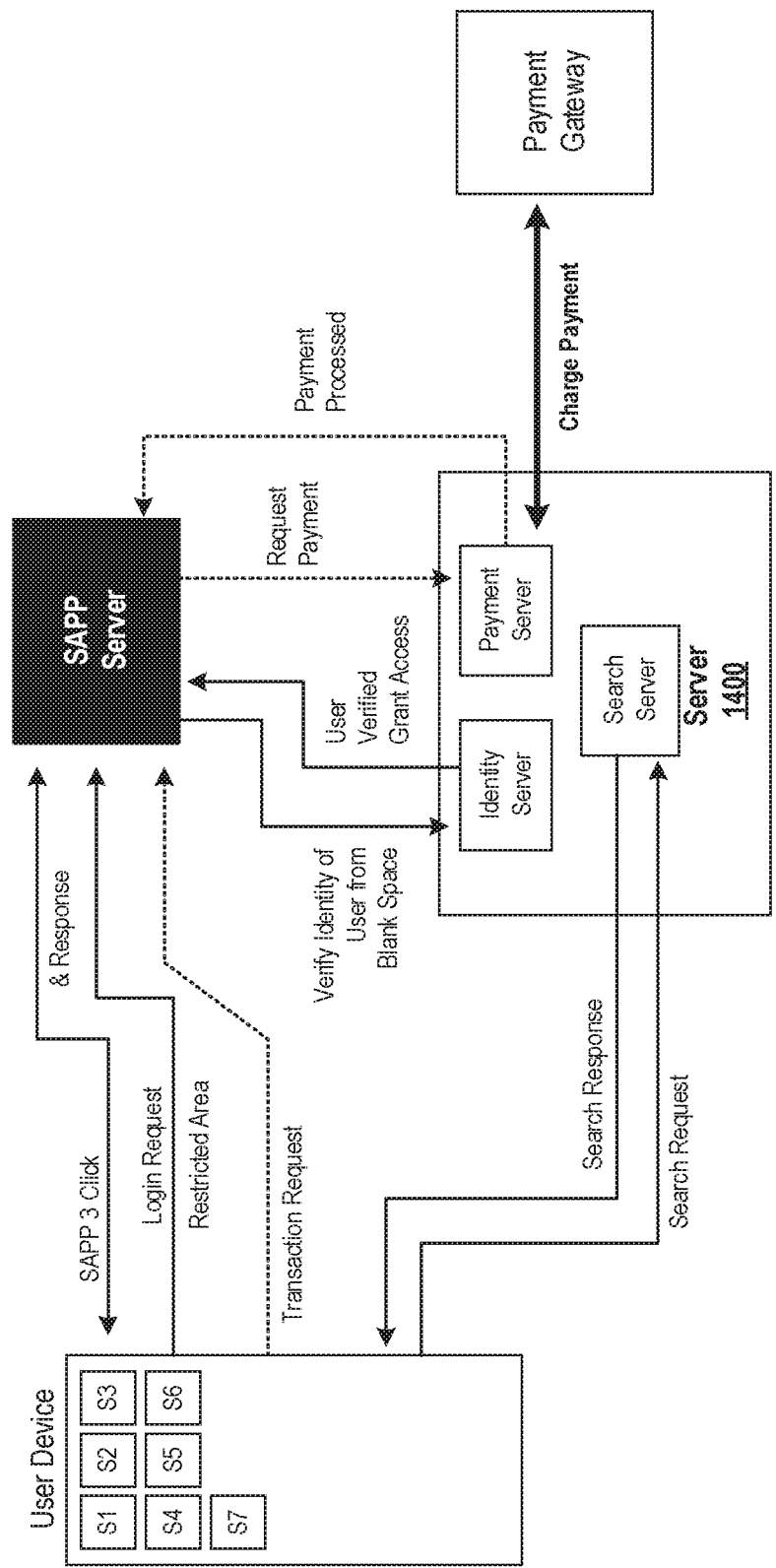
FIG. 15 shows identity and payment management.

FIG. 15 shows identity and payment management. The user device can interact directly with a server hosting the application (see SAPP server in FIG. 15). The user device can request to log in and/or can request a transaction to occur. When the SAPP server receives a login request or the transaction request, the SAPP server can forward the request to the server 1400, which in turn can provide the necessary identification information to the SAPP server based on authenticating the user previously. Similarly, the SAPP server can request payment from the server 1400, which can provide the payment to the SAPP server without providing the user's payment information to the SAPP server. At the same time, or subsequently, the server 1400 can request payment from the user's payment gateway, such as PayPal, credit card company, or bank.

Figure 16:
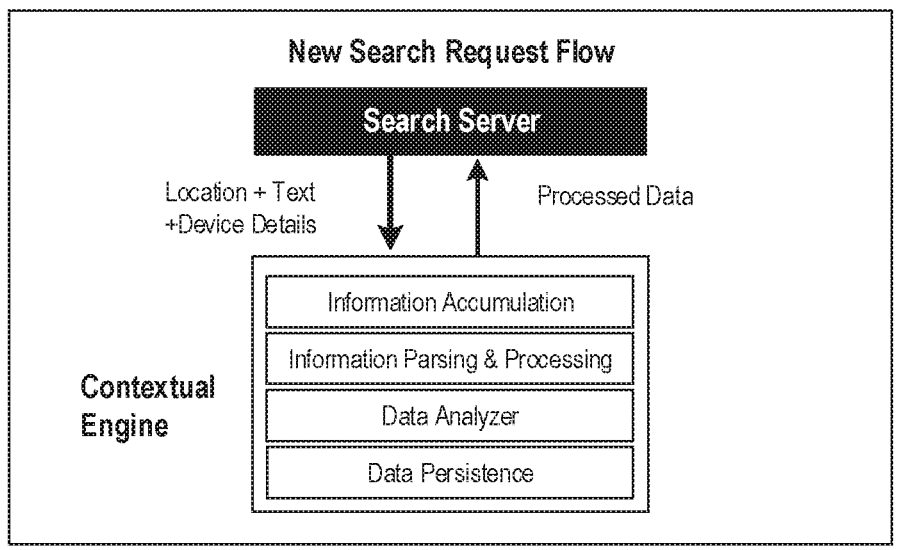
FIG. 16 shows components of the context engine.

FIG. 16 shows components of the context engine. The context engine can receive information from the user device including location, text, and device details, and can analyze the received information to create a user profile including user attributes, as shown in FIG. 23. The context engine can contain multiple modules including information accumulation, information parsing and processing, data analyzer and data persistence. The data persistence module can perform low-pass filtering on the received data to remove anomalous high frequency data and noise. For example, upon receiving location data that shows user location varying by more than a mile per 4 seconds, the data persistence module can smooth the location data, thus disregarding the high frequency variation and noise. The context engine can label users and assign label scores indicating a confidence of the context engine in the label.

The context engine can include artificial intelligence such as machine learning and/or neural networks to infer, understand, and predict user behavior and traits. The context engine can use a user's history, scores and provider criteria, to develop a likelihood that the user clicks the provider application. The platform can then show the likelihood that the application will be clicked and can arrange applications in descending or ascending order. User's behavior, i.e. whether the user clicks on the application or not, can be used to back propagate and further train the artificial intelligence such as machine learning and/or neural networks to increase their accuracy.

Figure 17:
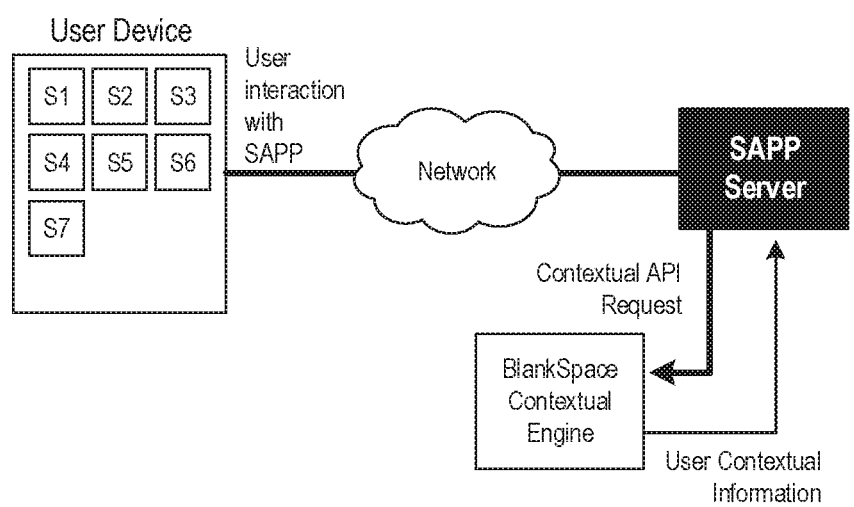
FIG. 17 shows user interaction with SAPP.

FIG. 17 shows a user interaction with SAPP. The user can interact with the applications presented to the user of the user device, as shown in FIG. 17. Upon receiving the user interaction with one of the applications S1-S7, such as a selection of the application or a user input into the applications S1-S7, the user interaction with SAPP is passed through the network to the SAPP server. To respond to the user interaction, the SAPP server can request contextual information about the user from the context engine. For example, the request can ask for the user attributes such as one of the attributes shown in FIG. 23. In a more specific example, if the user requests sneakers, the SAPP server can request information about the user income. If the income is high, the SAPP server can provide a more expensive list of speakers, however, if the income is low, the SAPP server can provide a less expensive list of sneakers.

Figure 18:
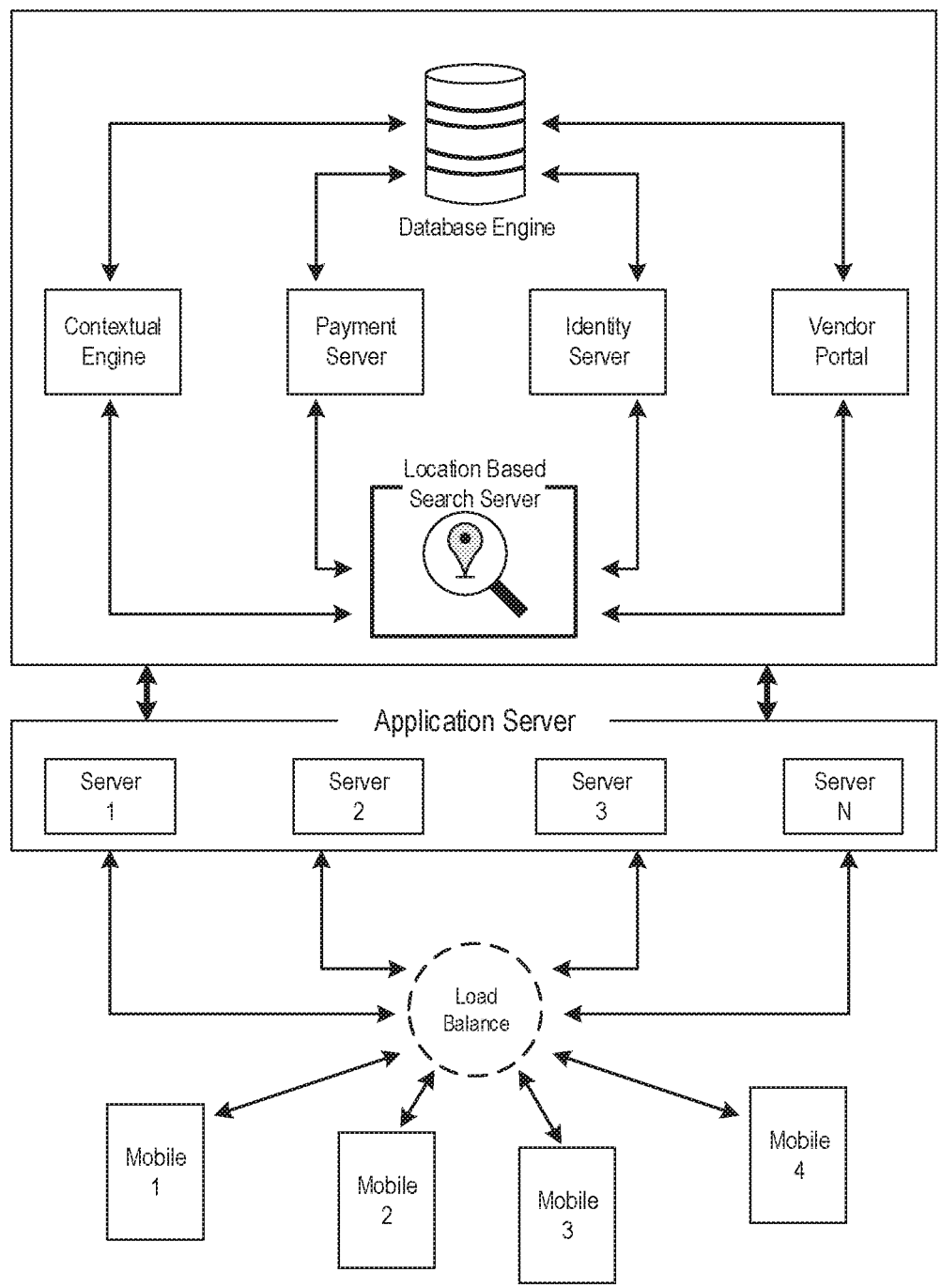
FIG. 18 shows a backend server component in a clustered environment.

FIG. 18 shows a backend server component in a clustered environment. The application server in FIG. 18 can be the SAPP server in FIGS. 14-17. The application server can include multiple servers 1-N. The interaction with multiple user devices (i.e., mobile 1-mobile 4 in FIG. 18), can be distributed among the application servers 1-N using a load balancer in FIG. 18. The load balancer can manage the data and requests among multiple servers 1-N, so that the mobile devices 1-4 do not experience a delay in communication.

FIG. 19 shows sideband information flow, for example, the role of the context database in providing information to the supplier (i.e., the provider), so that the supplier can better determine a response to provide to the user. For example, if the user requests a list of holidays in the year 2019, the supplier can request the user's religious beliefs from the context database. The context database can specify that the user is an Orthodox Christian, and the supplier can provide the user with a list of national holidays as well as Orthodox Christian holidays.

Figure 20:
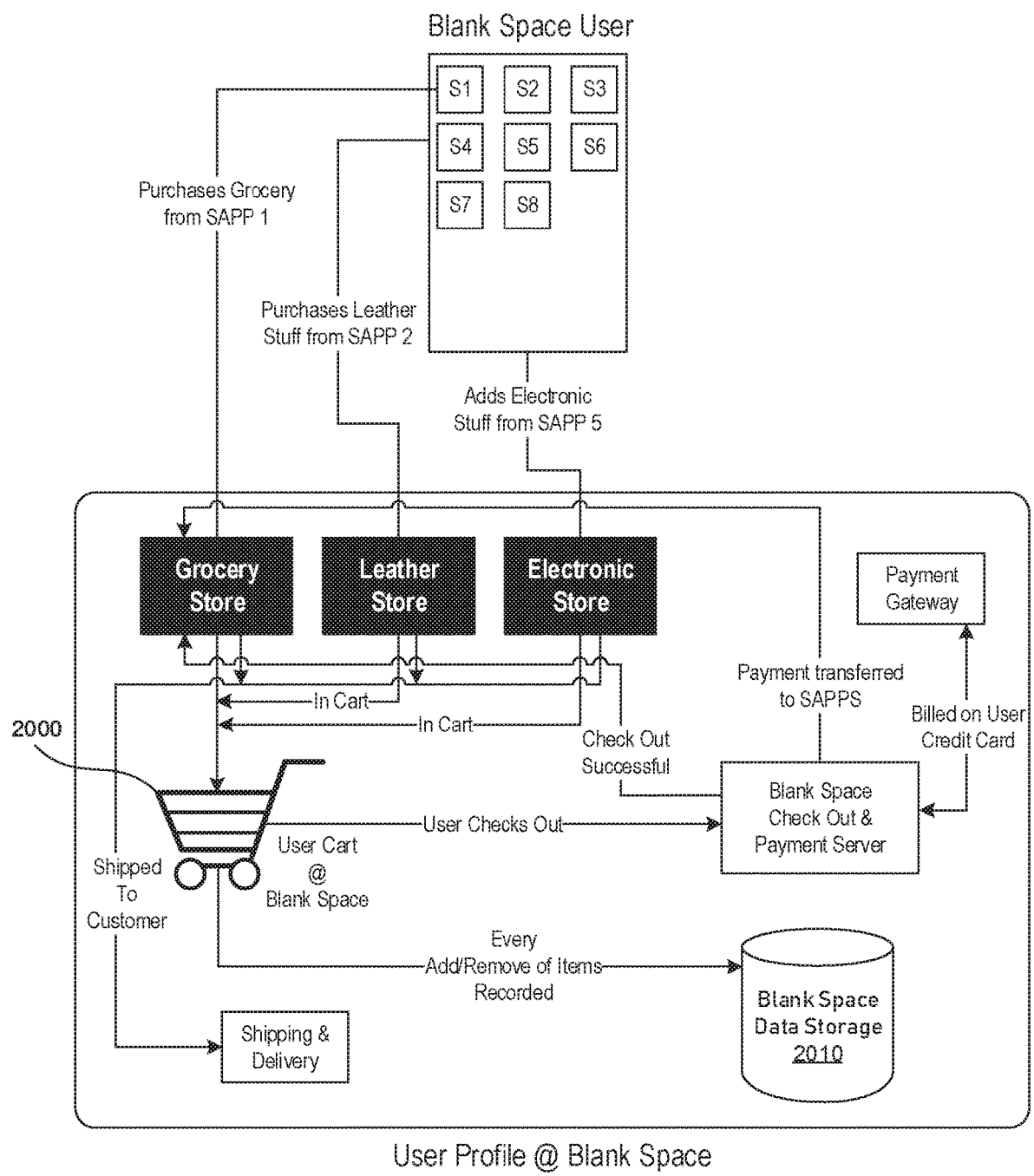
FIG. 20 shows integrated cart management framework.

FIG. 20 shows integrated cart management framework. All items/services offered by all participating suppliers are available to be purchased within the platform, e.g. Blank-Space, and can be added by the user to a user cart 2000, as opposed to separate carts managed by each vendor. As a result, the user can pick items from across all vendor applications and drop them into a single cart and then make a single purchase.

For example, as opposed to buying hammer from one SAPP and then going through a checkout process, and then buying nails from another SAPP and then going through a checkout process, in the platform the user can select hammer from SAPP 1 and nails from SAPP 2 into a single cart and then checkout once. The platform server 1400 in FIG. 14 detects that the cart contains items from multiple stores and handles the transaction with each store separately. The user, however, perceives just one transaction conducted across multiple small applications. This is a much better flow for the user, with less friction as the user makes only one purchase while buying items from several vendors.

When the user is adding items to his shopping cart, he is providing valuable information about his needs and preferences to the platform server 1400—captured in database 2010. Having visibility into what people drop into their cart 2000 allows the server 1400 to build a better understanding of user preferences, use that to offer more tailored products and services to the user thus allowing the software to better serve the user.

Providing tailored products and services can be based on training AI models on the data captured database 2010 and predicting what services the user is likely to use and what products the user is likely to buy. Additionally, the same methodology can be used to answer questions about a user, such as whether the user a female or male, whether the user an impulsive buyer, etc.

System Operation

Figure 4:
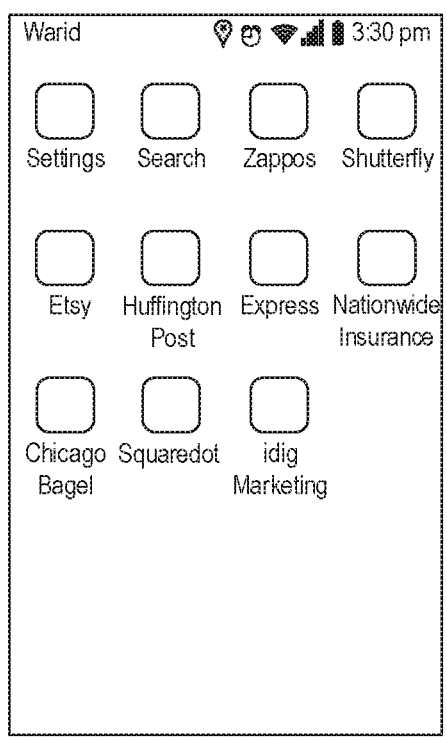
FIG. 4 shows an updated dashboard.
Figure 21:
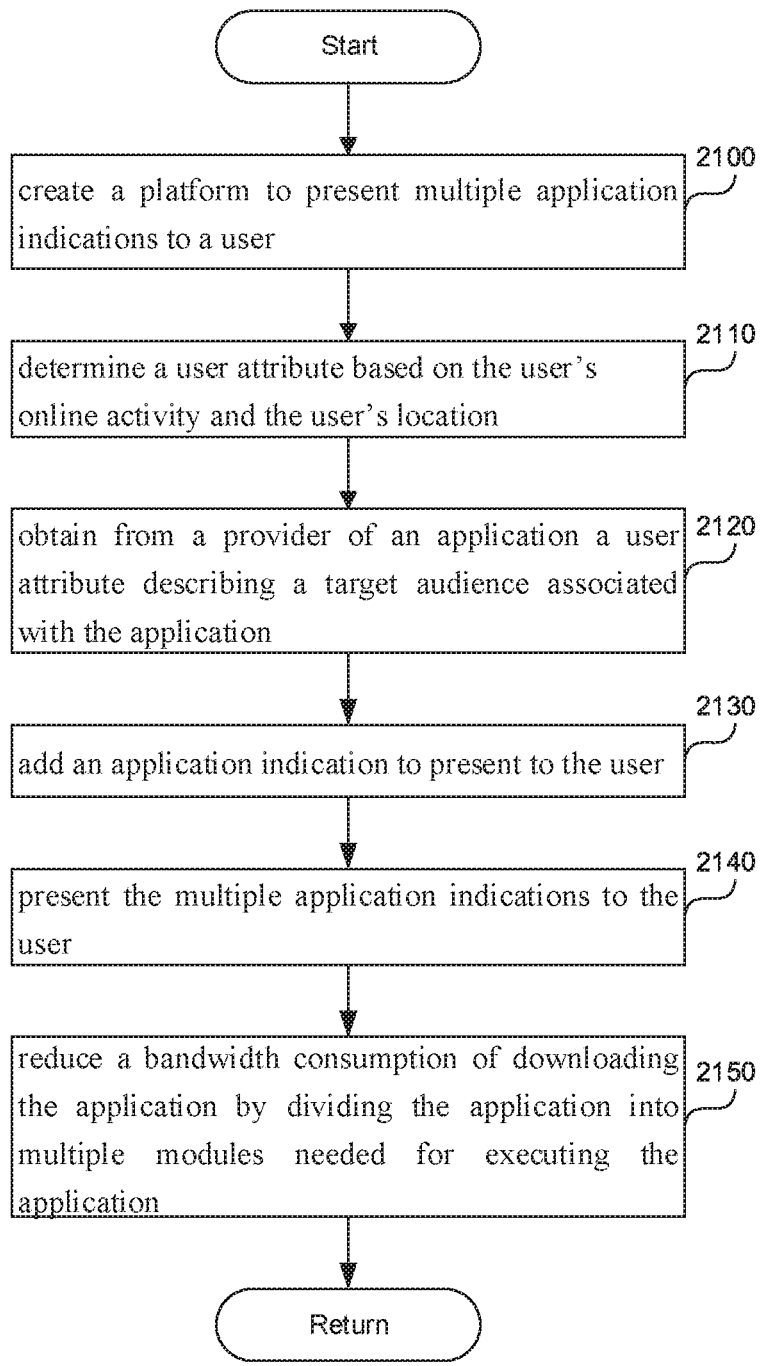
FIG. 21 is a flowchart of a method to manage and present multiple applications to a user while reducing use of resources such as bandwidth, processor load, power consumption and/or storage footprint.

FIG. 21 is a flowchart of a method to manage and present multiple applications to a user while reducing use of resources such as bandwidth, processor load, power consumption, and/or storage footprint. In step 2100, a processor can create a platform to present multiple application indications to a user. The platform can include a graphical user interface (GUI) such as shown in FIGS. 3-4. The application indications can include application icons representing each application.

In step 2110, the processor can determine a user attribute based on the user's online activity, the user's location, and/or a contextual attribute. The user's online activity can include a search, a click, and/or a hashtag specified or searched by the user. The contextual attribute can be an attribute that is momentarily true, such as the user has been walking for 20 minutes or the user is driving. The user attribute can include age, gender, religious belief, views, income, and/or lifestyle. For example, if the user tends to read liberal websites, the processor can infer that the user's views are liberal. In another example, if the user searches for medical conditions related to age and/or spends time on websites related to the elderly, such as Medicare or Medicaid, the processor can infer that the user is 65 years or older. In a third example, if a user searches for sports equipment, hiking trails, and/or athletic activities, the processor can infer that the user has an active lifestyle. In a fourth example, if the user visits shops that cater to women, such as cosmetics, or women clothing, the processor can infer that the user is a female.

In step 2120, the processor can obtain from a provider of the application a user attribute describing a target audience associated with the application. The user attribute describing the target audience, similarly, can include age, gender, religious belief, views, income, lifestyle and/or a contextual attribute The contextual attribute can be true momentarily and can include information about whether the user is close to home or the user is traveling, whether the user is on foot or is driving.

In step 2130, the processor can add an application indication to the multiple application indications to present to the user based on the determined user attribute and the user attribute received from a provider of the application. Application indication can be an icon representing the application. For example, the user attributes can be separated into multiple categories such as age, gender, religious beliefs, views, income, and/or lifestyle. A value of the determined user attribute and the user attribute received from the provider can be specified per category.

For example, the determined user attribute can have values such as age: 53; gender: male; religious beliefs: unknown; views: conservative; income: unknown; lifestyle: hunter. The user attribute received from the provider can have values such as age: 45-60; gender: any; religious beliefs: any; views: any; income: $50,000 and above; lifestyle: active. The provider can specify the constraint in which some attributes are more important, and others less so. The processor can match the determined user attribute and the user attribute received from the provider category by category and determine whether the values match.

In the above example, the age of the determined user attribute is within the age range of the user attribute received from the provider. Categories of gender, religious beliefs, and views are specified as "any" by the provider, so, by definition, any value of the determined user attribute can match. The determined user attribute of income is unknown, so the processor cannot determine whether a match or a mismatch exists and can ignore the category.

To determine whether the value of the lifestyle category matches between the determined user attribute and the user attribute received by the provider, the processor can retrieve a list of related user attribute values. For lifestyle attribute value of "active," the processor can retrieve a list of related user attribute values such as "athletic," "biker," "tennis player," or "hunter." If the attribute value is not in the list, the processor can perform a dictionary lookup to determine whether there is a match. In the present case, there is a match because the user attribute "hunter" is in the list of related attributes associated with the attribute value of "active." Consequently, the processor can determine that the lifestyle attribute values match. Overall, the processor can conclude that there is a match between the determined user attribute and the user attribute received from the provider because seven of the categories match and one is unknown.

In addition to or instead of the above example, to perform the match, the processor can calculate a match score where each match receives a positive value, such as 1. The match value can vary based on the quality of the match. Each mismatch can receive a negative value, such as −1, where the mismatch value can vary based on the magnitude of the mismatch. In the end, the values can be summed, and a value above a certain threshold, such as 0, can be considered a match, whereas a value below the certain threshold can be considered a mismatch. The applications which have a higher match score with the user can be a longer period of time and higher up in the rank order, while those with a lower match score will be displayed with a lower priority—further lower down in the rank order, or for a shorter period of time.

In a third example to match users and providers, an artificial intelligence such as machine learning and/or neural network model can continuously receive user activity and history along with the provider attributes to determine an overall match, thus determining which applications to show the user. Actual user click activity can be provided as a feedback to the artificial intelligence such as a machine learning model and/or neural network to increase the accuracy of future matches.

In step 2140, the processor can present the multiple application indications to the user. In step 2150, the processor can reduce a bandwidth consumption of downloading the application by dividing the application into multiple modules needed for executing the application, downloading a subset of the multiple modules to a device associated with the user, and storing the rest of the multiple modules on a device associated with the provider of the application which can include SAPPs server 1400 in FIG. 14 and/or provider's device. The download of the application can occur via various networks such as the Internet, local area network, wireless network, cellular network, and mesh network. The multiple modules can include software libraries, functional units such as a GUI, an analysis module, and/or a processor intensive module.

The processor can download the GUI module and/or a GUI library to the user's device, and can keep the analysis module, the processor intensive module, and rest of the libraries on the provider device. By keeping modules having large storage footprints on the server, the processor can save the network bandwidth as well as storage space of the user device. In some cases, the savings can result in tens of gigabytes of code that is kept on the provider device, such as a server, as opposed to transmitted to the user device, such as a phone.

In another example, several icons can be displayed to the user, but none of the application code has been transferred to the user device, and only when the user actually clicks an application icon the necessary code for that particular application is transferred to the user device.

In a third example, the processor can reduce the bandwidth consumption of downloading the application by preserving the application on the user device and removing the application indication, such as an application icon, from the multiple application indications presented to the user. That is, the processor can keep two separate lists associated with the applications, namely, one list can be presented to the user as available applications, and the second list can be the list of applications downloaded to the device. The two lists do not have to be identical, though they can be overlapping. Upon adding the application icon to the multiple application icons presented to the user and receiving a selection of the application icon, the processor can execute the application without downloading the code that is already stored on the device.

The processor can also reduce a storage footprint of the preserved application by compressing the preserved application using an executable compressor such as Crinkler, dotBundle, or NeoLight. The processor can store the preserved application on the device associated with the user, so that the next time the user wants to access the application, the processor does not need to download it.

Figure 22:
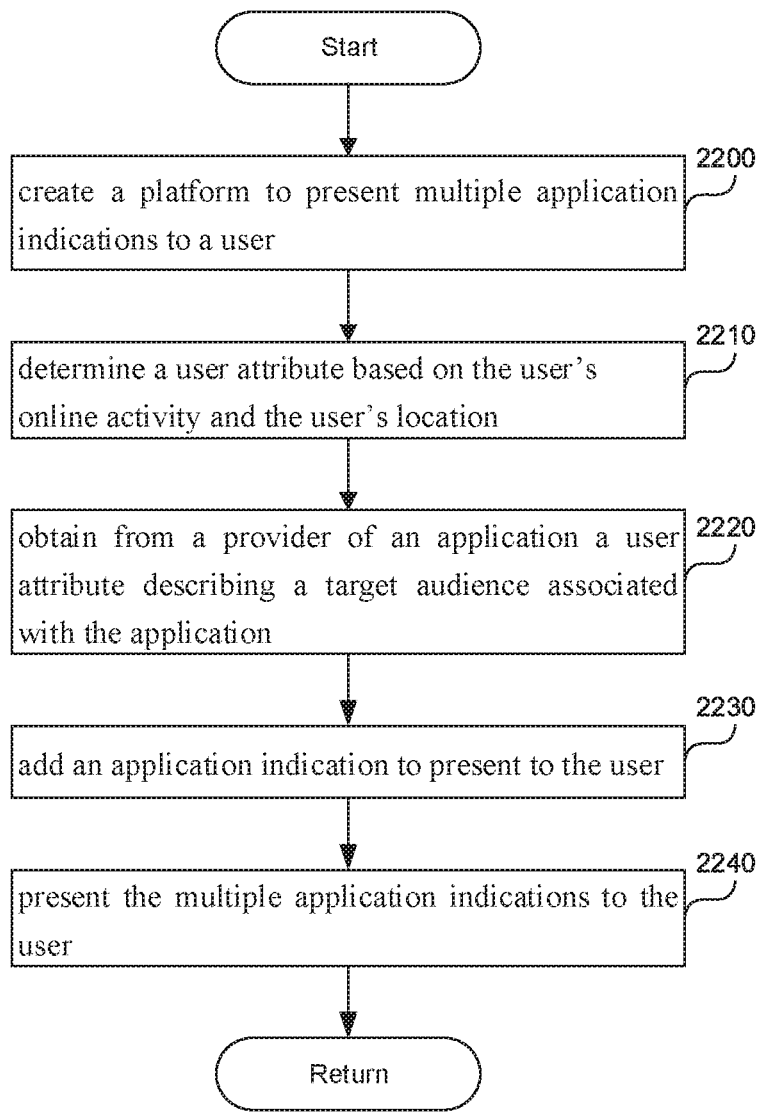
FIG. 22 is a flowchart of a method to present multiple application indications to a user.

FIG. 22 is a flowchart of a method to present multiple application indications to a user. In step 2200, a processor can create a platform to present multiple application indications to the user. The platform can be a GUI showing application icons, as shown in FIGS. 3-4.

In step 2210, a processor can determine a user attribute based on the user's online activity, the user's location and/or a contextual attribute. The contextual attribute can represent a momentary state, captured in real time, such as whether the user is walking, driving, and/or following his usual habit by going for a morning walk or to a coffee shop. The determined user attribute can include age, gender, religious beliefs, views, lifestyle, and/or income. To determine the user attribute, the processor can track the user's movement or the user's online activity, such as a search, a click, and/or a hashtag. These attributes can be used to provide multiple application indications to the user. In addition, the attributes can be provided to SAPP vendors to consider in tailoring responses to the user.

In step 2220, the processor can obtain from a provider of an application a user attribute describing a target audience associated with the application. For example, the provider of the application, such as Huffington Post as shown in FIG. 4, can specify that the user attribute describing the target audience is "liberal" views.

In step 2230, the processor can add an application indication to the multiple application indications based on the determined user attribute and the user attribute received from a provider of the application. For example, the processor can find all users of the platform for whom the determined user attribute indicates "liberal" views and can add the Huffington Post application icon to the multiple icons to be presented to the user. In step 2240, the processor can present the multiple application indications, for example, multiple icons, to the user as shown in FIG. 4.

The processor can modify the multiple application indications presented to the user based on the time of day. For example, the processor can determine by tracking user's online activity and/or location that the user tends to read news in the morning on the weekends in a coffee shop, and can present the Huffington Post icon to the user between 7:00 a.m. and 10:00 a.m. on Saturday and Sunday when the user is in the coffee shop.

In another example, a local dog grooming business can make itself known to a potential user by indicating to the processor that the desired user attributes include people who take walks around 6:00 a.m. within a 10 mile radius of the location of the dog grooming business. By tracking the user's location and time of day, the processor can determine whether a user tends to walk around 6:00 a.m. within the specified region. Consequently, the processor can present to the user an application indication, such as an application icon, for an application associated with the dog grooming business.

The processor can also modify the multiple application indications presented to the user based on the user's location. The processor can determine the user's location, and if the user's location is within a proximity of a provider who has specified location as one of the desired user attributes, the processor can present the provider's application icon to the user. For example, a provider, Chicago Bagel, has specified that when a user is within 5 miles of one of Chicago Bagel's storefronts, the Chicago Bagel application icon should be presented to the user, as shown in FIG. 4. Consequently, whenever the user of the platform is within 5 miles of a Chicago Bagel storefront, the Chicago Bagel application icon can be presented to the user, as shown in FIG. 4.

In another example, if the user is traveling, the processor can track the user's location and can populate the multiple application indications presented to the user based on the user location, user interests, and provider services. By presenting to the user services of potential interest to the user, the platform can help the user successfully navigate a new location. For example, if the user is traveling, the platform can present to the user different application indications associated with different transport options, such as public transportation, taxi, or locally available ridesharing services, such as Lyft and Uber.

The provider can also be mobile, such as an ice cream vendor, or a mobile dog groomer, who is passing the user's neighborhood. When the provider approaches the user's neighborhood or is in the user's neighborhood, the provider's application can become visible to the user.

The processor can reduce a storage footprint of the application by dividing the application into multiple modules needed for executing the application. The modules can include a library, a functional part of the application such as a GUI, a resource specific application code, and/or a resource intensive application code. The processor can download a subset of the multiple modules to a device associated with the user and can store the rest of the multiple modules on a device associated with the provider of the application. For example, by downloading modules that have a small storage footprint to the user's device, while leaving the modules that have a large storage footprint on the provider's device, the processor can save both the network bandwidth and the memory of the user's device. The user's device can be a personal device, such as a watch, a cell phone, or a Fitbit. The provider's device can be a remote computer, such as mobile device associated with the provider, a server and/or a cloud computer.

The processor can also reduce power consumption of the user device by obtaining a first module among the multiple modules that requires less computation power than a second module among the multiple modules and downloading the first module to the device associated with the user. For example, the first module can be a user interface, such as a graphical user interface or a voice user interface, while the second module can be the speech recognition module. To determine which module uses how much computational power, the processor can retrieve metadata stored with the modules which indicates the previously measured computational power required by the module. In addition to, or instead of, the processor can generate the metadata automatically by executing the various modules and determining the necessary computational resources, such as processing power, memory usage, and BIOS speed. By leaving processor intensive modules, such as a speech recognition module, on the provider's device, the processor can save the processing power and power consumption of the user's device by approximately up to 90%.

For readability purposes, the processor can limit the number of application indications presented to the user. When the multiple application indications exceed a threshold number of application indications, the processor can remove a first application from the multiple application indications based on a criteria including a likelihood of future use which can be can be calculated based on a frequency of use associated with the multiple application indications. For example, the processor can remove an application that is the least used, an application that hasn't been used in the last predefined period of time, such as a week, an application whose geographic criterium does not match the user's location and/or an application where the associated services are not available at that time because of operating hours/holidays.

The processor can initialize the platform by populating, using an artificial intelligence, the multiple application indications based on most searched hashtags on the platform, a location of the user, and/or applications used by other users of the platform having a location proximate to the location of the user. After initialization, the artificial intelligence can infer user attributes based on the user's online activity, the user's location and/or contextual information The processor can replace a first application indication based the inferred user attributes.

For example, as the user moves around, the processor can refresh the application icons, such as application icons shown in FIG. 3, presented to the user after a predetermined interval, such as 2 seconds, configured in the settings. The processor can display updated application icons, such as application icons shown in FIG. 4. The platform may also calculate the refresh interval based on the frequency of user interaction with the device, or the speed of movement of the user. For example, if the user frequently interacts with the devices and changes the applications used, the refresh interval can be smaller than the frequency of switching the applications. Similarly, if the user changes locations quickly, the refresh interval can be smaller than the change of location.

The platform can also serve as a central identity manager. The platform can authenticate the user using a username and password login, or biometrics such as fingerprint detection, retina scan, voice authentication, and/or face scan. Upon authenticating the user, the platform can authenticate the user with the application without requiring user input. If the user has an existing username and password login, the platform can store the existing username and password and provide that to the application. If the user wants to create a new login, or is a first-time user, the platform can create and store user login information. The platform can interact with the application using an application programming interface (API) to authenticate the user. The application programming interface can be specific to the platform.

The platform can also serve as a central payment information manager. The platform can receive payment information from a user, such as a credit card, PayPal account, or bank. Upon receiving a request for a payment from the application, the processor can act as an intermediary between the application requesting payment and the payment provider, without providing payment information to the requesting application. In one example, the processor can make the payment to the application using funds associated with the platform, and request a reimbursement from the payment provider, such as a credit card. In another example, the processor can forward the payment request to the payment provider, receive the funds from the payment provider, and forward the funds to the requesting application.

The processor can enable providers to create applications, which can be presented to the user through the platform. The processor can receive from the provider an input, including the target audience associated with the application and contact information associated with the provider, such as a provider's website, phone number, and/or a link to an executable code associated with the provider. The processor can automatically create the application and the application indication based on the input from the provider, and can present the application indication to the user.

For example, the provider of the application can be a business that a majority of potential users are unaware of, such as a new provider, a small provider, and/or a seasonal provider. The provider can use the platform to make platform users aware of the presence of the provider. For example, the provider can be a florist, a seasonal business mostly providing services around Valentine's Day or Mother's Day. The florist may want to make potential users aware of the florist's presence outside of those two peak times. The florist can use the platform, as shown in FIG. 22, to provide information about the business, such as the florist contact information, website (if any), link to an executable code (if any), flowers selection, busy times, etc. The platform can automatically create an application icon to present to the user. The platform can receive a selection of the application indication from the user, such as a click of the application icon. Upon receiving the selection, the application can establish a contact between the provider and the user by, for example, placing a call, placing an order, scheduling an appointment, sending the user to the website, and/or executing the instructions of the executable code.

The processor can maintain multiple applications on a user device different from the application indications presented to the user. For example, the maintained applications may not be presented to the user or presented applications may not be stored on the user device. The processor can reduce a bandwidth consumption by downloading the application to the user's device upon receiving a selection of the application indication from the user, or by removing the application indication without removing the application from the device associated with the user.

By downloading the application to the user's device upon receiving the selection, the processor does not consume the network bandwidth anticipating the need for the application. That way, if the user never selects the application, the processor does not consume the bandwidth by downloading the application and can only remove the application icon from the platform. Similarly, if an application receives an update during the time between when the application icon was presented to the user and when the application icon was selected, the processor does not consume the bandwidth to download the old code and the update, and instead the processor only downloads the updated application.

By not removing the application from the user's device, even after removing the application icon, the processor can prevent the downloading of the application the next time the user uses the application. For example, by observing user's application usage, the processor can determine whether an application, whose application icon is to be removed, is likely to be used again, and if the application is likely to be used again, the processor can decide to maintain the application of the user's device. If the application is not likely to be used again, the processor can remove the application from the user's device. The user's application usage, for example, can include how frequently the user uses the application. If the user uses the application once every month, but the processor updates the application icons presented to the user once every week, the application whose application icon has been deleted can be maintained on the user's device to prevent downloading the application again in a month.

In addition, the processor can enable the user to seamlessly purchase multiple products from multiple providers, without the user authorizing a transaction with each provider. For example, the processor can obtain from the user the products to purchase associated with the multiple applications. The processor can receive an instruction from the user to purchase the products and can purchase the products by completing multiple transactions with the multiple applications, without requesting an authorization from the user for each transaction in the plurality of transactions, thus making user's awareness of each single purchase unnecessary.

FIG. 23 shows a provider interface. The provider can specify the contact information such as a name, an email, a phone number, a website, or an application, such as an application available from an application repository such as Google Play Store or Apple Application Store. The provider can provide a logo, so that the processor can use the logo in creating an application indication to present to the user. If the provider specifies the application, the processor can obtain the application icon from the application repository and present the application icon to the user. Upon presenting the application icon to the user or upon user selecting the application icon, the processor can automatically download the application. In addition, as shown in FIG. 23, the provider can specify various user attributes, desired user location, and/or time of day associated with the user location and/or user attributes.

Computer System

Figure 24:
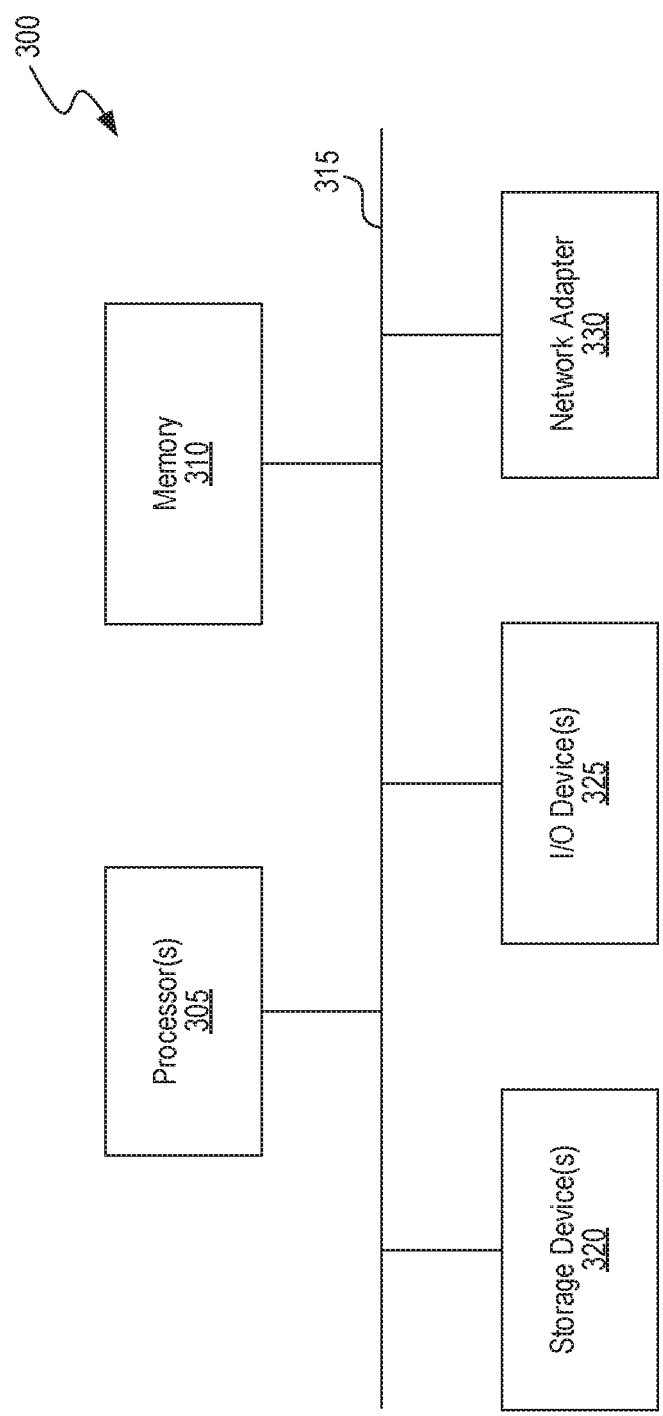
FIG. 24 shows a diagrammatic representation of a machine in the example form of a computer system within which a set of instructions for causing the machine to perform one or more of the methodologies discussed herein may be executed.

FIG. 24 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry®, a processor, a telephone, a web appliance, a network router, switch or bridge, a console, a hand-held console, a hand-held gaming device, a music player, any portable, mobile, hand-held device or wearable device, or any machine capable of executing a set of instructions (sequential or otherwise) that specify actions to be taken by that machine.

The computing system 300 may include one or more central processing units (processors) 305, memory 310, input/output devices 325 (e.g., keyboard and pointing devices), touch devices, display devices, storage devices 320 (e.g., disk drives), and network adapters 330 (e.g., network interfaces), that are connected to an interconnect 315. The interconnect 315 is illustrated as an abstraction that represents any one or more separate physical buses, point to point connections, or both, connected by appropriate bridges, adapters, or controllers. The interconnect 315, therefore, may include, for example, a system bus, a peripheral component interconnect (PCI) bus or PCI-Express bus, a Hyper-Transport (HT) or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The processor 305 can be the processor executing the various steps described in this application. The processor can be associated with the user device, the server 1400 in FIG. 14, and/or the SAPP server. The memory 310 and/or the storage devices 320 can store instructions which cause the processor to perform the various steps described in this application. The network adapters 330 can facilitate the communication between the user device, the server 1400 in FIG. 14, and/or the SAPP server.

The memory 310 and storage devices 320 are computer-readable storage media that may store instructions that implement at least portions of the various embodiments. In addition, the data structures and message structures may be stored or transmitted via a data transmission medium, for example, a signal on a communications link. Various communications links may be used, for example, the Internet, a local area network, a wide area network, or a point-to-point dial-up connection. Thus, computer readable media can include computer-readable storage media, for example, non-transitory media, and computer-readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300, for example, via network adapter 330.

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example, using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods, and their related results, according to the embodiments of the present disclosure, are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The invention claimed is:

1. A method comprising:
providing a processor that presents a plurality of application indications to a user for display on a mobile device associated with the user, the mobile device including a mobile processor and a memory;
said processor determining a user attribute based on a user's online activity with said mobile device and a location of the user;
said processor receiving from a provider of an application a user attribute describing a target audience associated with the application;
said processor comparing the determined user attribute with the user attribute received from the provider of the application;
said processor automatically adding an application indication to the plurality of application indications to present to the user for display on the mobile device associated with the user based on comparing the determined user attribute with the user attribute received from the provider of the application and further based on said location of the user;
said processor presenting the plurality of application indications to the user for display on the mobile device associated with the user; and
said processor reducing a bandwidth consumption of the mobile device from downloading the application by:
dividing the application into a plurality of modules needed for executing the application on the mobile device associated with the user;
downloading to the mobile device associated with the user a subset of the plurality of modules when requested by the user by selection of a corresponding application indication on the mobile device by the user and storing the rest of the plurality of modules on a device associated with the provider of the application;
decoupling viewability of the application indication on the mobile device associated with the user and availability of the application for execution on the mobile device associated with the user by creating a first list including the plurality of application indications to present to the user for display on the mobile device associated with the user that comprise available applications, and a second list including a plurality of applications that have been downloaded to the mobile device associated with the user; and
based on any of the determined user attribute, the user attribute received from the provider of the application, and the location of the user, automatically removing the application indication from the first list, wherein the application indication is no longer displayed to the user on the mobile device, while maintaining the subset of the plurality of modules associated with the application indication downloaded on the mobile device;
wherein upon said processor automatically adding the removed application indication to the plurality of application indications presented to the user on the mobile device based on any of the determined user attribute, the user attribute received from the provider of the application, and the location of the user, and further based upon said mobile device receiving a selection of the application indication by the user, said mobile device executing the application.

2. The method of claim 1, said maintaining the subset of the plurality of modules associated with the application on the mobile device comprising:
reducing a storage footprint of the application associated with the removed application indication by compressing the application; and
storing the application on the device associated with the user.

3. A method comprising:
providing a processor that presents a plurality of application indications to a user for display on a mobile device associated with the user, the mobile device including a mobile processor and a memory;
said processor determining a user attribute based on a user's online activity with said mobile device and a location of the user;
said processor receiving, from a provider of an application, a user attribute describing a target audience associated with the application;
said processor comparing the determined user attribute with the user attribute received from the provider of the application;
said processor automatically adding an application indication to the plurality of application indications for display on the mobile device associated with the user based on comparing the determined user attribute and the user attribute received from the provider of the application and further based on said location of the user;
said processor presenting the plurality of application indications to the user for display on the mobile device associated with the user; and
said processor reducing a bandwidth consumption of the mobile device from downloading the application by:
decoupling viewability of the application indication on the mobile device associated with the user and availability of the application for execution on the mobile device associated with the user by creating a first list including the plurality of application indications to present to the user for display on the mobile device associated with the user that comprise available applications, and a second list including a plurality of applications that have been downloaded to the mobile device associated with the user; and
based on any of the determined user attribute, the user attribute received from the provider of the application, and the location of the user, automatically removing the application indication from the first list, wherein the application indication is no longer displayed to the user on the mobile device, while maintaining at least a portion of the application associated with the application indication downloaded on the mobile device associated with the user.

4. The method of claim 3, comprising:
reducing a storage footprint of the application by dividing the application into a plurality of modules needed for executing the application, downloading a subset of the plurality of modules to the mobile device associated with the user and storing the rest of the plurality of modules on a device associated with the provider of the application.

5. The method of claim 4, comprising:
reducing power consumption of the device associated with the user by obtaining a first module in the plurality of modules that requires less computation power than a second module in the plurality of modules and downloading the first module to the device associated with the user.

6. The method of claim 3, comprising:
when the plurality of application indications exceeds a threshold number of application indications, removing a first application from the plurality of application indications based on a criteria comprising a likelihood of future use.

7. The method of claim 3, comprising:
initializing a platform by populating, by an artificial intelligence, the plurality of application indications based on most searched hashtags on the platform, a location of the user and applications used by other users of the platform having a location proximate to the location of the user.

8. The method of claim 3, comprising:
upon initialization, inferring user attributes, by an artificial intelligence, based on the user's online activity and the location of the user; and
replacing a first application indication in the plurality of application indications based on the inferred user attributes.

9. The method of claim 3, comprising:
authenticating the user by a platform;
receiving a request for an authentication from an application associated with the application indication in the plurality of application indications; and
upon receiving the request, authenticating, by the platform, the user with the application without requiring a user input into the application.

10. The method of claim 9, said authenticating the user with the application comprising:
interacting with the application using an application programming interface (API) to authenticate the user.

11. The method of claim 3, comprising:
receiving payment information associated with the user; and
upon receiving a payment request from an application associated with the application indication in the plurality of application indications, providing a payment to the application without forwarding the payment information associated with the user to the application.

12. The method of claim 3, the determined user attribute and the user attribute specified by the provider, comprising an age, gender, belief, views, lifestyle, income, location or time of day.

13. The method of claim 3, said determining the user attribute comprising:
tracking a search, a click, a hashtag or a movement associated with the user; and
identifying, by an artificial intelligence, the determined user attribute based on the search, the click, the hashtag or the movement.

14. A system comprising a processor configured to:
provide a platform that presents a plurality of application indications to a user for display on a mobile device associated with the user, the mobile device including a mobile processor and a memory;

determine a user attribute based on a user's online activity with said mobile device and a location of the user;

receive from a provider of an application a user attribute describing a target audience associated with the application;

compare the determined user attribute with the user attribute received from the provider of the application;

add an application indication to the plurality of application indications to present to the user for display on the mobile device associated with the user based on comparing the determined user attribute with the user attribute received from the provider of the application and further based on said location of the user;

present the plurality of application indications to the user for display on the mobile device associated with the user; and reduce a bandwidth consumption of the mobile device from downloading the application by:

decoupling viewability of the application indication on the mobile device associated with the user and availability of the application for execution on the mobile device associated with the user by creating a first list including the plurality of application indications to present to the user for display on the mobile device associated with the user that comprise available applications, and a second list including a plurality of applications that have been downloaded to the mobile device associated with the user; and based on any of the determined user attribute, the user attribute received from the provider of the application, and the location of the user, automatically removing the application indication from the first list, wherein the application indication is no longer displayed to the user on the mobile device, while maintaining at least a portion of the application associated with the application indication downloaded on the mobile device associated with the user.

15. The system of claim 14, comprising the processor to:
maintain the plurality of applications stored on the mobile device associated with the user, wherein the plurality of applications is different from the plurality of application indications presented to the user; and reduce the bandwidth consumption by downloading the application to the mobile device associated with the user upon receiving a selection of the application indication from the user or by removing the application indication from the plurality of application indications without removing the application from the mobile device associated with the user.

16. The system of claim 14, comprising the processor to:
receive from the provider an input comprising the target audience associated with the application and a contact information associated with the provider;

automatically create the application and the application indication based on the input from the provider; and present the application indication to the user.

17. The system of claim 14, comprising the processor to:
obtain from the user a plurality of products to purchase associated with a plurality of applications represented by at least a portion of the plurality of application indications;

receive an instruction from the user to purchase the plurality of products; and purchase the plurality of products by completing a plurality of transactions with the plurality of applications, without requesting an authorization from the user for each transaction in the plurality of transactions.

18. The system of claim 16, comprising the processor to:
reduce a storage footprint of the application by compressing the application; and store the application on the mobile device associated with the user.

19. The system of claim 16, comprising the processor to:
receive payment information associated with the user; and upon receiving a payment request from an application associated with the application indication in the plurality of application indications, provide a payment to the application without forwarding the payment information associated with the user to the application.

20. The method of claim 3, wherein a second application indication in the plurality of application indications is associated with a second application, wherein the second application is not stored on the mobile device associated with the user.

\* \* \* \* \*